US012164249B2

(12) United States Patent
Matsuda et al.

(10) Patent No.: US 12,164,249 B2
(45) Date of Patent: Dec. 10, 2024

(54) FIXING DEVICE AND IMAGE FORMING APPARATUS INCORPORATING SAME

(71) Applicants: Ryohei Matsuda, Kanagawa (JP); Kentaro Yamashita, Shizuoka (JP)

(72) Inventors: Ryohei Matsuda, Kanagawa (JP); Kentaro Yamashita, Shizuoka (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 18/157,388

(22) Filed: Jan. 20, 2023

(65) Prior Publication Data

US 2023/0280682 A1 Sep. 7, 2023

(30) Foreign Application Priority Data

Feb. 1, 2022 (JP) ................................. 2022-014533
Nov. 28, 2022 (JP) ................................. 2022-189133

(51) Int. Cl.
*G03G 15/20* (2006.01)

(52) U.S. Cl.
CPC ................................ *G03G 15/2039* (2013.01)

(58) Field of Classification Search
CPC ........... G03G 15/2039; G03G 15/2053; G03G 15/2042
See application file for complete search history.

(56) References Cited

U.S. PATENT DOCUMENTS

2009/0196643 A1* 8/2009 Mito .................. G03G 15/2039 399/334
2013/0209124 A1* 8/2013 Saito .................. G03G 15/2039 399/69
2015/0185671 A1* 7/2015 Ikebuchi ............ G03G 15/2039 399/69
2016/0274510 A1* 9/2016 Hase .................. G03G 15/2039
2016/0274516 A1 9/2016 Yamaguchi et al.
(Continued)

FOREIGN PATENT DOCUMENTS

| | | |
|---|---|---|
| JP | 2009-276549 | 11/2009 |
| JP | 2020-067476 | 4/2020 |
| JP | 2022-087671 | 6/2022 |

OTHER PUBLICATIONS

U.S. Appl. No. 17/900,880, filed Sep. 1, 2022, Toshiyuki Kabata, et al.

*Primary Examiner* — Sandra Brase
(74) *Attorney, Agent, or Firm* — Harness, Dickey & Pierce, P.L.C.

(57) ABSTRACT

A fixing device includes a fixing rotator, a first heater, a second heater, and circuitry. The first heater heats a region on the fixing rotator to heat a recording medium having a width smaller than a predetermined width. The second heater heats a region on the fixing rotator to heat a maximum recording medium used in the fixing device. The second heater has a heat generation distribution in which a heat generation amount of each of both end portions corresponding to both end portions of the maximum recording medium in a width direction of the recording medium is larger than a heat generation amount of a center portion. The circuitry determines whether to turn on the first heater and turn off the second heater or to turn on both the first heater and the second heater based on a required power to bring the fixing rotator to a fixing temperature.

20 Claims, 8 Drawing Sheets

(56) References Cited

U.S. PATENT DOCUMENTS

| | | | |
|---|---|---|---|
| 2016/0378033 | A1 | 12/2016 | Ishigaya et al. |
| 2017/0010571 | A1 | 1/2017 | Matsuda et al. |
| 2017/0017182 | A1 | 1/2017 | Saito et al. |
| 2017/0205742 | A1 | 7/2017 | Shoji et al. |
| 2017/0255147 | A1 | 9/2017 | Seki et al. |
| 2017/0261900 | A1 | 9/2017 | Sawada et al. |
| 2018/0011432 | A1 | 1/2018 | Yoshinaga et al. |
| 2018/0157198 | A1 | 6/2018 | Seto et al. |
| 2018/0284663 | A1 | 10/2018 | Matsuda et al. |
| 2018/0335733 | A1 | 11/2018 | Matsuda et al. |
| 2018/0348680 | A1 | 12/2018 | Fujimoto et al. |
| 2018/0356754 | A1 | 12/2018 | Yoshinaga et al. |
| 2019/0243291 | A1 | 8/2019 | Matsuda et al. |
| 2020/0285180 | A1 | 9/2020 | Matsuda et al. |
| 2020/0401068 | A1 | 12/2020 | Matsuda et al. |
| 2021/0041818 | A1 | 2/2021 | Matsuda |
| 2021/0223722 | A1 | 7/2021 | Yamashita |
| 2022/0171315 | A1 | 6/2022 | Matsuda et al. |
| 2022/0291613 | A1 | 9/2022 | Yamaguchi et al. |

* cited by examiner

FIXING DEVICE AND IMAGE FORMING APPARATUS INCORPORATING SAME

CROSS-REFERENCE TO RELATED APPLICATIONS

This patent application is based on and claims priority pursuant to 35 U.S.C. § 119 (a) to Japanese Patent Applications No. 2022-014533, filed on Feb. 1, 2022, and No. 2022-189133, filed on Nov. 28, 2022, in the Japan Patent Office, the entire disclosures of which are hereby incorporated by reference herein.

BACKGROUND

Technical Field

Embodiments of the present disclosure generally relate to a fixing device and an image forming apparatus incorporating the fixing device.

Related Art

One type of image forming apparatus includes a fixing device. One type of fixing device includes a fixing member and a plurality of heaters having different heat generation distributions to heat the fixing member and fixes an image on a recording member onto the recording member.

SUMMARY

This specification describes an improved fixing device that includes a fixing rotator, a first heater, a second heater, and circuitry. The first heater heats at least a region on the fixing rotator to heat a small recording medium having a width smaller than a predetermined width. The second heater heats a region on the fixing rotator to heat a maximum recording medium having a maximum width among widths of recording media used in the fixing device. The second heater has a heat generation distribution in which a heat generation amount of each of both end portions corresponding to both end portions of the maximum recording medium in a width direction of the maximum recording medium is larger than a heat generation amount of a center portion. The circuitry determines whether to turn on the first heater and turn off the second heater or to turn on both the first heater and the second heater based on a required power to bring the fixing rotator to a fixing temperature to fix an image onto the small recording medium.

This specification also describes an image forming apparatus including the fixing device.

This specification further describes an improved image forming apparatus that includes an image former, a fixing device, and circuitry. The image former forms an image on a recording medium. The fixing device includes a fixing rotator, a first heater, and a second heater. The first heater heats at least a region on the fixing rotator to heat a small recording medium having a width smaller than a predetermined width. The second heater heats a region on the fixing rotator to heat a maximum recording medium having a maximum width among widths of recording media used in the fixing device. The second heater has a heat generation distribution in which a heat generation amount of each of both end portions corresponding to both end portions of the maximum recording medium in a width direction of the maximum recording medium is larger than a heat generation amount of a center portion. The circuitry determines whether to turn on the first heater and turn off the second heater or to turn on both the first heater and the second heater based on a required power to bring the fixing rotator to a fixing temperature to fix an image onto the small recording medium.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
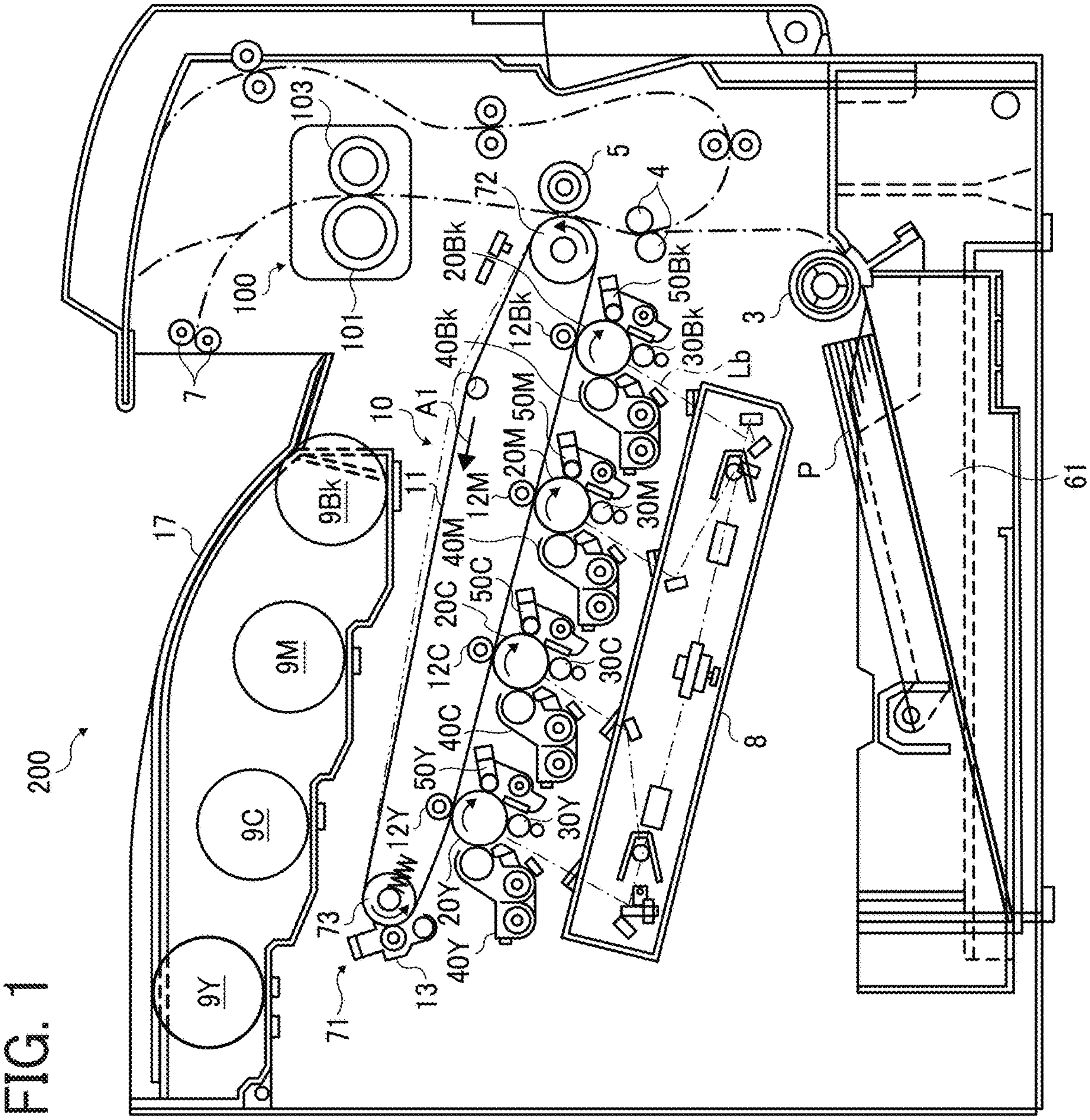
FIG. 1 is a schematic cross-sectional view of a printer according to an embodiment of the present disclosure.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Referring to the attached drawings, the following describes embodiments of the present disclosure. In the drawings for illustrating embodiments of the present disclosure, identical reference numerals are assigned to elements such as members and parts that have an identical function or an identical shape as long as differentiation is possible, and descriptions of such elements may be omitted once the description is provided.

A description is provided of a construction of a printer 200 according to an embodiment of the present disclosure, that is, a color printer employing an electrophotographic method. The printer 200 serves as an image forming apparatus incorporating a fixing device according to an embodiment of the present disclosure.

FIG. 1 is a schematic cross-sectional view of the printer 200 according to the embodiment of the present disclosure.

The printer 200 depicted in FIG. 1 is a color printer employing a tandem system in which a plurality of image forming devices that forms images in a plurality of colors, respectively, is arranged in a stretch direction of a transfer belt 11 serving as an intermediate transferor. However, the image forming apparatus employing the fixing device according to the embodiment of the present disclosure is not limited to the printer 200 employing the tandem system. The image forming apparatus employing the fixing device according to the embodiment of the present disclosure may be a copier, a facsimile machine, or the like instead of a printer.

The printer 200 employs the tandem system in which photoconductor drums 20Y, 20C, 20M, and 20Bk are arranged. The photoconductor drums 20Y, 20C, 20M, and 20Bk serve as image bearers that bear images in yellow, cyan, magenta, and black as color separation components, respectively.

In the printer 200, the yellow, cyan, magenta, and black toner images formed on the photoconductor drums 20Y, 20C, 20M, and 20Bk, respectively, are primarily transferred successively onto the transfer belt 11 that is an endless belt disposed opposite the photoconductor drums 20Y, 20C, 20M, and 20Bk as the transfer belt 11 rotates in a rotation direction A1 such that the yellow, cyan, magenta, and black toner images are superimposed on a same position on the transfer belt 11 in a primary transfer process. Through the primary transfer process, the yellow, cyan, magenta, and black toner images are superimposed on the transfer belt 11 and then secondarily transferred onto a sheet P serving as a recording medium collectively in a secondary transfer process.

Each of the photoconductor drums 20Y, 20C, 20M, and 20Bk is surrounded by image forming units that form the yellow, cyan, magenta, and black toner images on the photoconductor drums 20Y, 20C, 20M, and 20Bk as the photoconductor drums 20Y, 20C, 20M, and 20Bk rotate clockwise in FIG. 1. Taking the photoconductor drum 20Bk that forms the black toner image, the following describes an image forming operation to form the black toner image. The photoconductor drum 20Bk is surrounded by a charger 30Bk, a developing device 40Bk, a primary transfer roller 12Bk, and a cleaner 50Bk in this order in a rotation direction of the photoconductor drum 20Bk. The photoconductor drums 20Y, 20C, and 20M are also surrounded by chargers 30Y, 30C, and 30M, developing devices 40Y, 40C, and 40M, primary transfer rollers 12Y, 12C, and 12M, and cleaners 50Y, 50C, and 50M in this order in a rotation direction of each of the photoconductor drums 20Y, 20C, and 20M, respectively. After the charger 30Bk uniformly charges the photoconductor drum 20Bk, an optical writing device 8 writes an electrostatic latent image on the photoconductor drum 20Bk with a laser beam Lb.

As the transfer belt 11 rotates in the rotation direction A1 in FIG. 1, the yellow, cyan, magenta, and black toner images formed on the photoconductor drums 20Y, 20C, 20M, and 20Bk, respectively, are primarily transferred successively onto the transfer belt 11, thus being superimposed on a same position on the transfer belt 11. The primary transfer rollers 12Y, 12C, 12M, and 12Bk disposed opposite the photoconductor drums 20Y, 20C, 20M, and 20Bk, respectively, via the transfer belt 11 apply a voltage to primarily transfer the toner images formed on the photoconductor drums 20Y, 20C, 20M, and 20Bk at different times from the upstream photoconductor drum 20Y to the downstream photoconductor drum 20Bk in the rotation direction A1 of the transfer belt 11.

The photoconductor drums 20Y, 20C, 20M, and 20Bk are arranged in this order from the upstream photoconductor drum 20Y to the downstream photoconductor drum 20Bk in the rotation direction A1 of the transfer belt 11. Imaging stations that form the yellow, cyan, magenta, and black toner images include the photoconductor drums 20Y, 20C, 20M, and 20Bk, respectively.

The printer 200 includes four imaging stations and a transfer belt unit 10. The four imaging stations form the yellow, cyan, magenta, and black toner images, respectively. The transfer belt unit 10 is disposed opposite and above the photoconductor drums 20Y, 20C, 20M, and 20Bk in FIG. 1. The transfer belt unit 10 includes the transfer belt 11 and the primary transfer rollers 12Y, 12C, 12M, and 12Bk. The printer 200 further includes a secondary transfer roller 5 and a belt cleaner 13. The secondary transfer roller 5 is disposed opposite the transfer belt 11 and rotates in accordance with rotation of the transfer belt 11. The belt cleaner 13 is disposed opposite the transfer belt 11 and cleans the transfer belt 11. The optical writing device 8 is disposed opposite and below the four imaging stations in FIG. 1.

The optical writing device 8 includes a semiconductor laser as a light source that writes an electrostatic latent image, a coupling lens, an fθ lens, a toroidal lens, a deflection mirror, and a rotatable polygon mirror serving as a deflector. The optical writing device 8 emits light beams Lb corresponding to the yellow, cyan, magenta, and black toner images to be formed on the photoconductor drums 20Y, 20C, 20M, and 20Bk thereto, forming electrostatic latent images on the photoconductor drums 20Y, 20C, 20M, and 20Bk, respectively. Although FIG. 1 illustrates the light beam Lb directed to the imaging station that forms the black toner image, the light beams Lb are also directed to the imaging stations that form the yellow, cyan, and magenta toner images, respectively.

The printer 200 further includes a sheet feeder 61, a registration roller pair 4, and a sensor. The sheet feeder 61 incorporates a paper tray that loads sheets P to be conveyed to a secondary transfer nip formed between the transfer belt 11 and the secondary transfer roller 5. The registration roller pair 4 conveys a sheet P conveyed from the sheet feeder 61 to the secondary transfer nip formed between the transfer belt 11 and the secondary transfer roller 5 at a predetermined time when the yellow, cyan, magenta, and black toner images superimposed on the transfer belt 11 reach the secondary transfer nip. The sensor detects a leading edge of the sheet P as the sheet P reaches the registration roller pair 4.

The printer 200 further includes a fixing device 100, a sheet ejecting roller pair 7, an output tray 17, and toner bottles 9Y, 9C, 9M, and 9Bk. The fixing device 100, as a fixing unit employing a contact heating system to heat the sheet P, includes a fixing belt 101 and a pressure roller 103 that fix a color toner image formed by the yellow, cyan, magenta, and black toner images secondarily transferred from the transfer belt 11 onto the sheet P thereon. The sheet ejecting roller pair 7 ejects the sheet P bearing the fixed color toner image onto an outside of a body of the printer 200, that is, the output tray 17. Hereinafter, the color toner image is referred to as the toner image or the image. However, the present embodiment is not limited to printing the color toner image. The image may be a monochrome image. The output tray 17 is disposed atop the body of the printer 200 and stacks the sheet P ejected onto the outside of the body of the printer 200 by the sheet ejecting roller pair 7. The toner bottles 9Y, 9C, 9M, and 9Bk are disposed below the output tray 17 in FIG. 1 and disposed inside the body of the printer 200. The toner bottles 9Y, 9C, 9M, and 9Bk are replenished with fresh yellow, cyan, magenta, and black toners, respectively.

In addition to the transfer belt 11 and the primary transfer rollers 12Y, 12C, 12M, and 12Bk, the transfer belt unit 10 includes a drive roller 72 and a driven roller 73 over which the transfer belt 11 is looped.

The driven roller 73 also serves as a tension applicator that applies tension to the transfer belt 11. A biasing member such as a spring biases the driven roller 73 against the transfer belt 11. The transfer belt unit 10, the primary transfer rollers 12Y, 12C, 12M, and 12Bk, the secondary transfer roller 5, and the belt cleaner 13 construct a transfer device 71.

The sheet feeder 61 is disposed in a lower portion of the body of the printer 200. The sheet feeder 61 includes a feed roller 3 that comes into contact with an upper surface of an uppermost sheet P of the sheets P loaded on the paper tray of the sheet feeder 61. As the feed roller 3 is driven and rotated counterclockwise in FIG. 1, the feed roller 3 feeds the uppermost sheet P to the registration roller pair 4.

The belt cleaner 13 installed in the transfer device 71 includes a cleaning brush and a cleaning blade that are disposed opposite and brought into contact with the transfer belt 11.

The cleaning brush and cleaning blade of the belt cleaner scrape and remove a foreign substance such as residual toner from the transfer belt 11, cleaning the transfer belt 11.

The belt cleaner 13 further includes a waste toner conveyer that conveys the residual toner removed from the transfer belt 11 for disposal.

Figure 2:
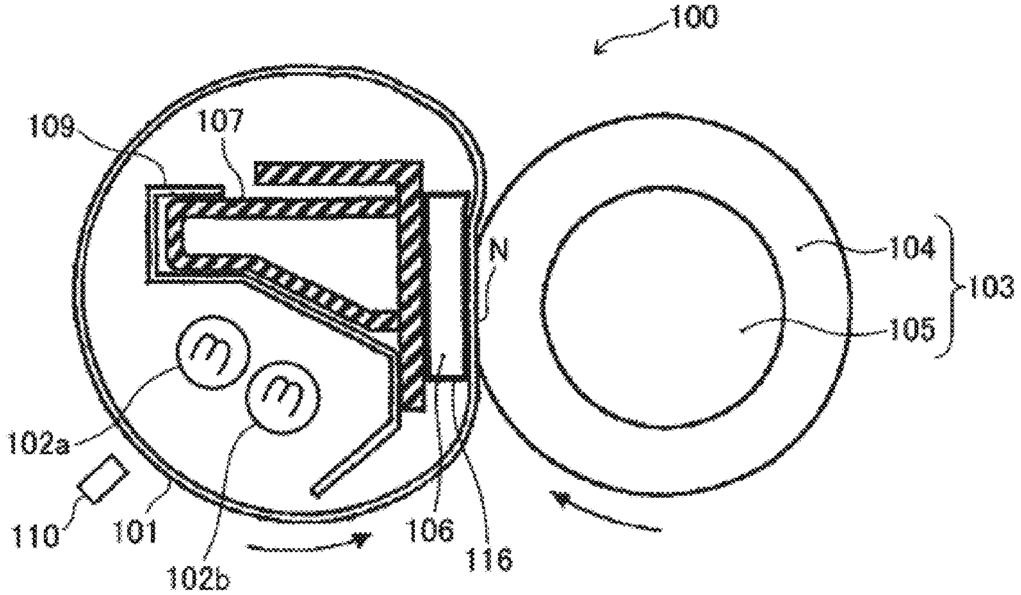
FIG. 2 is a schematic cross-sectional view of a fixing device incorporated in the printer depicted in FIG. 1.

A description is provided of a construction of the fixing device 100 incorporated in the printer 200. FIG. 2 is a schematic cross-sectional view of the fixing device 100.

The fixing device 100 includes the fixing belt 101 and the pressure roller 103. The fixing belt 101 serves as a fixing rotator that is rotatable in a rotation direction indicated with an arrow in FIG. 2. The pressure roller 103 serves as a pressure rotator that is disposed opposite the fixing belt 101 and rotatable in a rotation direction indicated with an arrow in FIG. 2. Within a loop formed by the fixing belt 101 are a main heater 102*a* serving as a first heater, a sub-heater 102*b* serving as a second heater, a pad 106 serving as a nip formation pad, a support 107, a slide aid 116, a reflector 109, and the like. Each of the main heater 102*a*, the sub-heater 102*b*, the pad 106, the support 107, and the slide aid 116 that are disposed within the loop formed by the fixing belt 101 has a length that is greater than a length of the fixing belt 101 in a width direction of the fixing belt 101. The width direction of the fixing belt 101 is a direction orthogonal to a sheet conveyance direction and a width direction of the sheet P.

The fixing belt 101 is an endless belt or film made of metal such as nickel and stainless used steel (SUS) or a resin material such as polyimide. The fixing belt 101 includes a base layer and a release layer. The release layer serves as a surface layer made of perfluoroalkoxy alkane (PFA), polytetrafluoroethylene (PTFE), or the like, facilitating separation of toner of the toner image on the sheet P from the fixing belt 101 and preventing the toner from adhering to the fixing belt 101. Optionally, an elastic layer made of silicone rubber or the like may be interposed between the base layer and the release layer. If the fixing belt 101 does not incorporate the elastic layer, the fixing belt 101 attains a decreased thermal capacity that improves a fixing property of being heated quickly. However, when the pressure roller 103 presses and deforms an unfixed toner image to fix the toner image on the sheet P, slight surface asperities of the fixing belt 101 may be transferred onto the toner image, causing a disadvantage that an orange peel mark remains on a solid part of the toner image as uneven gloss of the toner image or an orange peel image. To prevent the uneven gloss or the orange peel image, the elastic layer made of silicone rubber has a thickness of 100 μm or more. As the elastic layer deforms, the elastic layer absorbs the slight surface asperities, preventing the orange peel mark on the toner image.

The pressure roller 103 includes a core metal 105, an elastic rubber layer 104, and a release layer. The elastic rubber layer 104 is disposed on the core metal 105. The release layer serves as a surface layer that facilitates separation of the sheet P from the pressure roller 103. The release layer is made of PFA, PTFE, or the like. A driving force is transmitted to the pressure roller 103 from a driver such as a motor disposed in the printer 200 through a gear, thus rotating the pressure roller 103. A spring or the like presses the pressure roller 103 against the fixing belt 101, and the elastic rubber layer 104 is compressed and deformed so that the fixing nip N has a predetermined nip width. Alternatively, the pressure roller 103 may be a hollow roller. A heater such as a halogen heater may be disposed inside the pressure roller 103 as the hollow roller. The elastic rubber layer 104 may be made of solid rubber. Alternatively, if no heater is disposed inside the pressure roller 103, sponge rubber may be used. The sponge rubber enhances thermal insulation of the pressure roller 103, preferably causing the pressure roller 103 to draw less heat from the fixing belt 101.

The pad 106 serving as a nip formation pad is disposed within the loop formed by the fixing belt 101. The pad 106 is disposed opposite the pressure roller 103 via the fixing belt 101 to form the fixing nip N between the fixing belt 101 and the pressure roller 103. The pad 106 mounts the slide aid 116 over which an inner circumferential surface of the fixing belt 101 slides. The support 107 supports the pad 106.

The pad 106 illustrated in FIG. 2 has an opposed face that is disposed opposite the pressure roller 103 and is planar. Alternatively, the opposed face of the pad 106 may be recessed or may have other shapes. The opposed face of the pad 106 that is recessed causes the fixing nip N to be recessed toward the fixing belt 101. Accordingly, the fixing nip N directs the leading edge of the sheet P toward the pressure roller 103 when the sheet P is ejected from the fixing nip N, facilitating separation of the sheet P from the fixing belt 101 and thereby preventing the sheet P from being jammed.

The support 107 prevents the pad 106 from being bent by pressure received from the pressure roller 103, attaining a uniform length of the fixing nip N in the sheet conveyance direction throughout an entire span of the fixing belt 101 in the axial direction of the pressure roller 103.

Each of the main heater 102*a* and the sub-heater 102*b* is a halogen heater. The main heater 102*a* and the sub-heater 102*b* disposed opposite the inner circumferential surface of the fixing belt 101 heat the fixing belt 101 directly with radiant heat. Alternatively, each of the main heater 102*a* and the sub-heater 102*b* may be an induction heater (IH), a resistive heat generator, a carbon heater, or the like as long as the main heater 102*a* and the sub-heater 102*b* heat the fixing belt 101.

The fixing device according to the present embodiment includes the reflector 109 disposed between the main heater 102*a* and the support 107 and between the sub-heater 102*b* and the support 107. The reflector 109 reflects radiant heat and the like from the main heater 102*a* and the sub-heater 102*b*, preventing the radiant heat and the like from heating the support 107 and reducing resultant waste of energy. Instead of the reflector 109, a surface of the support 107 may be treated with thermal insulation or specular surface finish to attain similar advantages.

Outside the loop formed by the fixing belt 101, a temperature detecting sensor 110 is disposed. The temperature detecting sensor 110 serves as a temperature detector to detect the temperature of a surface of the fixing belt 101. The temperature detecting sensor 110 is a temperature sensor, such as a thermopile, that has an enhanced temperature responsiveness. The temperature detecting sensor 110 is disposed opposite a center span CS of the fixing belt 101 in the width direction of the fixing belt 101 and detects the temperature of the center span CS of the fixing belt 101 (see FIG. 6).

The fixing belt 101 rotates in accordance with rotation of the pressure roller 103. In the fixing device 100 illustrated in FIG. 2, as the driver drives and rotates the pressure roller 103, the driving force is transmitted from the pressure roller 103 to the fixing belt 101 at the fixing nip N, rotating the fixing belt 101 in accordance with rotation of the pressure roller 103. Heat and pressure in the fixing nip N fix the color toner image formed on the sheet P onto the sheet P.

The above-described configuration improves productivity and fixing performance at reduced costs.

Figure 3A:
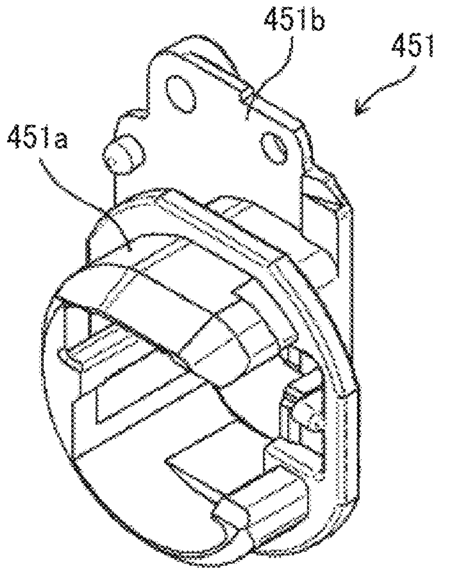
FIG. 3A is a perspective view of a guide incorporated in the fixing device depicted in FIG. 2.
Figure 3B:
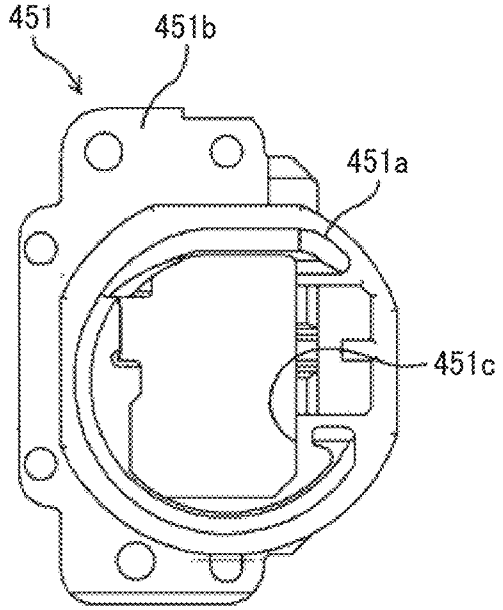
FIG. 3B is a front view of the guide depicted in FIG. 3A.

FIG. 3A is a perspective view of a guide 451 incorporated in the fixing device 100. FIG. 3B is a front view of the guide 451.

The guides 451 having an identical shape are disposed opposite both lateral ends of the fixing belt 101 in the width direction of the fixing belt 101, respectively. As illustrated in FIGS. 3A and 3B, the guide 451 includes an attachment portion 451*b* and a guide portion 451*a*. The attachment portion 451*b* is attached to a side plate of the fixing device 100. The guide portion 451*a* is disposed opposite the inner circumferential surface of the fixing belt 101 at a lateral end of the fixing belt 101 in the width direction thereof.

The guide portion 451*a* is substantially tubular and has a slit disposed opposite the pressure roller 103. An outer diameter of the guide portion 451*a* is equivalent to an inner diameter of the fixing belt 101. The guide portion 451*a* has a length in the width direction of the fixing belt 101, that is defined inward from a lateral edge of the fixing belt 101 in the width direction thereof, when the guide portion 451*a* is inserted into the fixing belt 101 for a predetermined amount. The guide portion 451*a* is inserted into a lateral end of the fixing belt 101. The fixing belt 101 slides on the guide portion 451*a* and maintains a circular cross-sectional shape.

As illustrated in FIG. 3B, the attachment portion 451*b* includes a through hole 451*c* disposed at a position corresponding to an interior of the guide portion 451*a*. The support 107, the main heater 102*a*, and the sub-heater 102*b* are attached to the side plate of the fixing device 100 through the through hole 451*c*.

Figure 4:
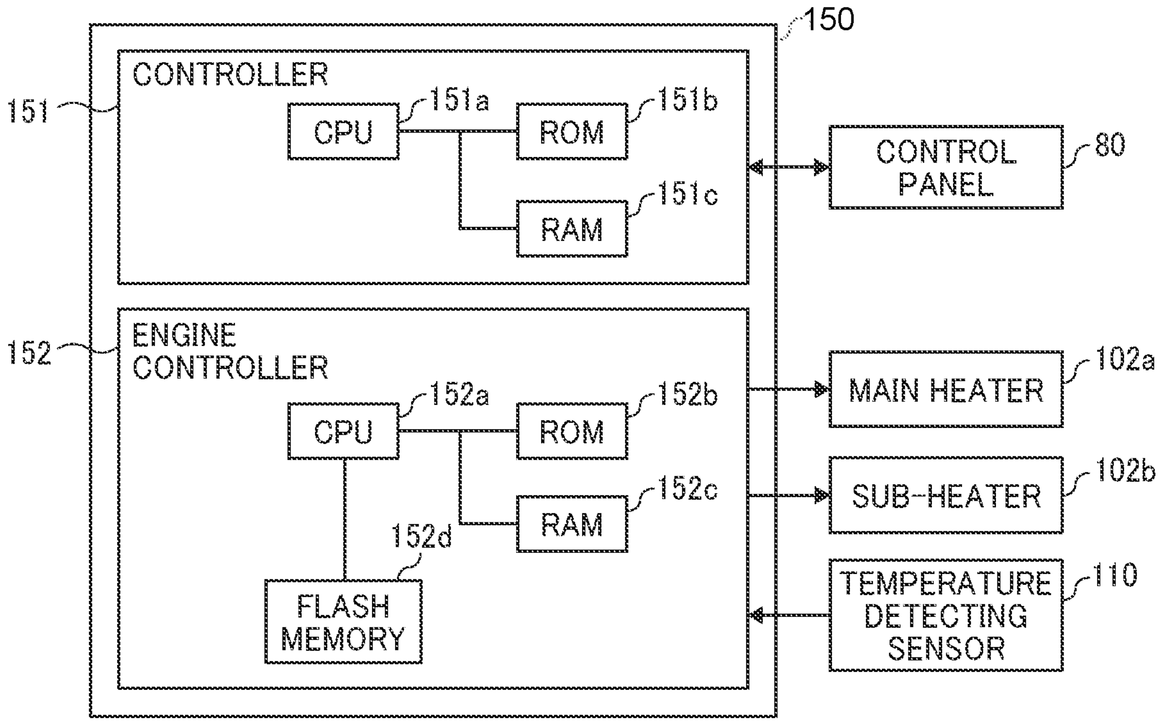
FIG. 4 is a block diagram of the printer depicted in FIG. 1, illustrating a control device that controls turning on of each of a main heater and a sub-heater incorporated in the fixing device depicted in FIG. 2.

FIG. 4 is a block diagram of the printer 200, illustrating a control device 150 that controls turning on of each of the main heater 102*a* and the sub-heater 102*b* in the fixing device 100.

The control device 150 is circuitry including a controller 151 and an engine controller 152. The controller 151 and the engine controller 152 include central processing units (CPU) 151*a* and 152*a*, read only memories (ROM) 151*b* and 152*b* for storing control programs, and random access memories (RAM) 151*c* and 152*c* for temporarily storing data, respectively. In addition, the engine controller 152 includes a nonvolatile flash memory 152*d*. The engine controller 152 of the control device 150 controls parts related to image forming processing such as the photoconductor drums, the developing device, the charger, the transfer device, and the fixing device. The engine controller 152 is coupled to the main heater 102*a*, the sub-heater 102*b*, the temperature detecting sensor 110, and the like in the fixing device. The controller 151 controls the entire operation of the image forming apparatus. For example, the controller 151 outputs a drive command signal for the fixing device to the engine controller 152. The engine controller 152 controls devices related to the image forming process, such as the fixing device 100, based on the drive command signal from the controller 151. The controller 151 is coupled to an operation panel 80 and outputs a display command to the operation panel 80. The operation panel 80 includes a display and an operation part to receive an input operation performed by a user.

When the user operates the operation panel 80 to input size data of the sheets P set in the sheet feeder 61, the control device 150 receives the size data and sends the size data to the engine controller 152 to store the size data in the nonvolatile flash memory 152*d*. The engine controller 152 of the control device 150 controls turning on of each of the main heater 102*a* and the sub-heater 102*b* based on the size data of the sheet stored in the nonvolatile flash memory and the temperature of the fixing belt 101 detected by the temperature detecting sensor 110.

The engine controller 152 of the control device 150 calculates a difference value between the surface temperature of the fixing belt 101 detected by the temperature detecting sensor 110 and a target temperature such as a target temperature during standby (hereinafter referred to as a standby temperature) or a target temperature for fixing the toner image onto the sheet (hereinafter referred to as a fixing temperature) and periodically determines power required to heat the fixing belt 101 to the target temperature based on the difference value. That is, the control device 150 functions as a power determiner. The engine controller 152 controls turning on of each of the main heater 102*a* and the sub-heater 102*b* based on the determined required power. In response to a large difference value between the surface temperature and the target temperature, the engine controller 152 increases the required power. As a result, the temperature of the fixing belt quickly reaches the target temperature. In response to a small difference value between the surface temperature and the target temperature, the engine controller 152 decreases the required power. As a result, the power consumption is reduced.

Figure 5:
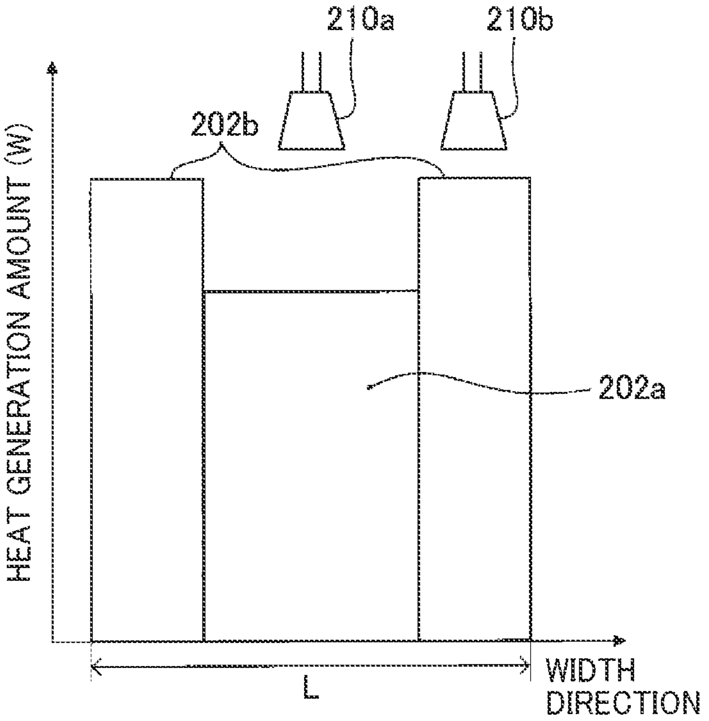
FIG. 5 (Prior Art)
FIG. 5 is a diagram of a fixing device according to a comparative embodiment, illustrating a configuration of heaters incorporated therein.

FIG. 5 is a diagram of a fixing device according to a comparative embodiment, illustrating a configuration of heaters incorporated therein.

As illustrated in FIG. 5, the fixing device according to the comparative embodiment includes a center heater 202*a* and a lateral end heater 202*b* and has a heat generation region L having a width equal to or larger than the largest width of widths of sheets passing through the fixing device in the width direction of the fixing belt. The center heater 202*a* has a heat generation distribution generated by a heat generation portion corresponding to a center portion of the heat generation region L. The lateral end heater 202*b* has a heat generation distribution generated by a heat generation portion corresponding to both end portions of the heat generation region L. Turning on the center heater 202*a* and the lateral end heater 202*b* generates heat in the heat generation region L. The horizontal axis in each of FIGS. 5 to 7, 12, and 14 represents positions on each heater in the width direction of the fixing belt with respect to the heaters 102*a*, 102*b*, 202*a*, and 202*b*, and represents positions on the fixing belt in the width direction of the fixing belt with respect to temperature detecting sensors 210*a*, 210*b*, and 110 and a power interrupter 130.

The fixing device according to the comparative embodiment includes a center temperature detecting sensor 210*a* and a lateral end temperature detecting sensor 210*b*. The center temperature detecting sensor 210*a* detects a temperature of a center span of the fixing belt in the width direction thereof. The lateral end temperature detecting sensor 210*b* detects a temperature of a lateral end span of the fixing belt in the width direction thereof. When a large sheet passes through the fixing device, a control device controls turning on of the lateral end heater 202*b* based on the temperature of the lateral end span of the fixing belt, that is detected by the lateral end temperature detecting sensor 210*b*. The control device controls turning on of the center heater 202*a* based on the temperature of the center span of the fixing belt, that is detected by the center temperature detecting sensor 210*a*. Accordingly, the center heater 202*a* and the lateral end heater 202*b* retain the fixing belt at a predetermined fixing temperature substantially throughout an entire span of the fixing belt in the width direction thereof.

The fixing device according to the comparative embodiment including the center heater 202*a* and the lateral end heater 202*b* that have the above-described heat generation distributions can turn off the lateral end heater 202*b* and fix the toner image onto the small sheet without heating both lateral end spans of the fixing belt 101. As a result, the above-described fixing device can prevent overheating of the lateral end spans of the fixing belt in the width direction of the fixing belt that is caused by continuously printing the toner images on a great number of small sheets with a short interval between successive small sheets. However, image forming apparatuses located in offices barely print a great number of sheets continuously and are barely requested to improve productivity in continuous printing. The image forming apparatuses located in the offices are requested to shorten a first print out time at reduced costs.

Figure 6:
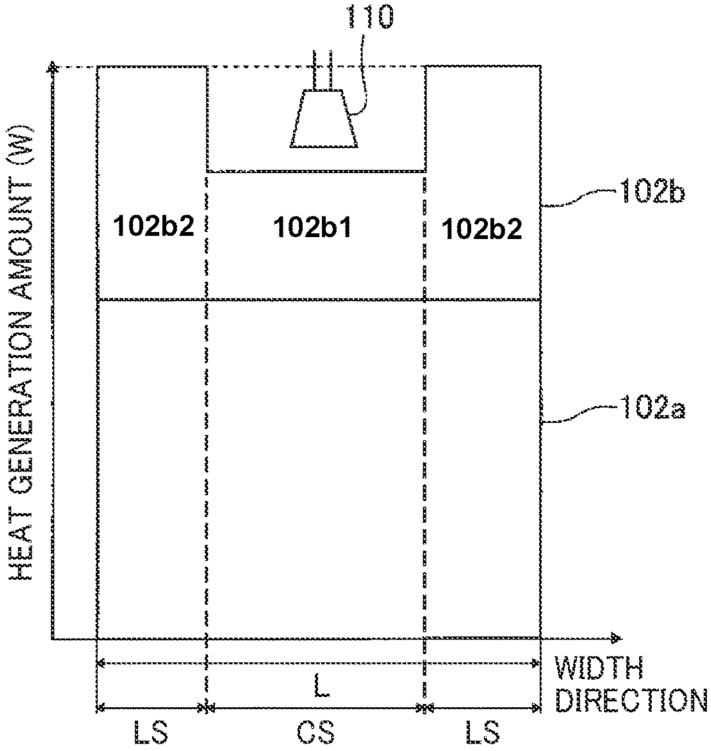
FIG. 6 is a diagram of the fixing device depicted in FIG. 2, illustrating a configuration of the main heater and the sub-heater incorporated therein.

To address this circumstance of the comparative embodiment, as illustrated in FIG. 6, the fixing device 100 according to the embodiment of the present disclosure includes the main heater 102*a* and the sub-heater 102*b*. The main heater 102*a* uniformly generates heat in the width direction of the fixing belt and has an even heat generation distribution in the width direction of the fixing belt. The sub-heater 102*b* includes a center portion 102*b*1 and lateral end portions 102*b*2 arranged with the center portion 102*b*1 in the width direction of the fixing belt. The sub-heater 102*b* has a heat generation distribution in which a heat generation amount of each of the lateral end portions 102*b*2 is larger than a heat generation amount of the center portion 102*b*1. The above-described configuration enables reducing the number of temperature detecting sensors from the configuration illustrated in FIG. 5, which enables reducing manufacturing costs. Turning on both the main heater 102*a* and the sub-heater 102*b* enables quickly raising the temperature of the fixing belt to the fixing temperature substantially uniformly, which can prevent degradation in the first print out time for a large sheet.

Referring to drawings, a description is provided of a construction of the fixing device 100 specifically.

FIG. 6 is a diagram of the fixing device 100, illustrating a configuration of the main heater 102*a* and the sub-heater 102*b*.

As illustrated in FIG. 6, the fixing device 100 according to the embodiment of the present disclosure includes the main heater 102*a* and the sub-heater 102*b*. The main heater 102*a* uniformly generates heat in the width direction of the fixing belt and has the even heat generation distribution in the width direction of the fixing belt. The sub-heater 102*b* has the heat generation distribution in which the heat generation amount of each of the lateral end portions 102*b*2 is larger than the heat generation amount of the center portion 102*b*1.

A heat generation region L of each of the main heater 102*a* and the sub-heater 102*b* is equal to or larger than a maximum width of widths of the sheets which the image forming apparatus can print, and the heat generation amount of the center portion 102*b*1 of the sub-heater 102*b* is smaller than a heat generation amount of the main heater 102*a* to heat the center span CS of the fixing belt 101. The fixing device 100 in the present embodiment includes a single temperature detecting sensor 110 facing the center span CS of the fixing belt 101 in the width direction of the fixing belt 101. Using the temperature detecting sensor 110, the engine controller 152 controls turning on the main heater 102*a* and the sub-heater 102*b* to maintain the temperature of the fixing belt 101 at the target temperature (that is, the standby temperature or the fixing temperature). According to the present embodiment, the single temperature detecting sensor, that is, the temperature detecting sensor 110, faces the center span CS of the fixing belt 101 in the width direction of the fixing belt 101. Alternatively, the temperature detecting sensor 110 may face another position of the fixing belt 101 in the width direction thereof where a sheet having a minimum width available in the printer 200 is conveyed over the fixing belt 101. In the present embodiment, the minimum width is a width of 105 mm of an A6 size sheet in portrait orientation.

Figure 7:
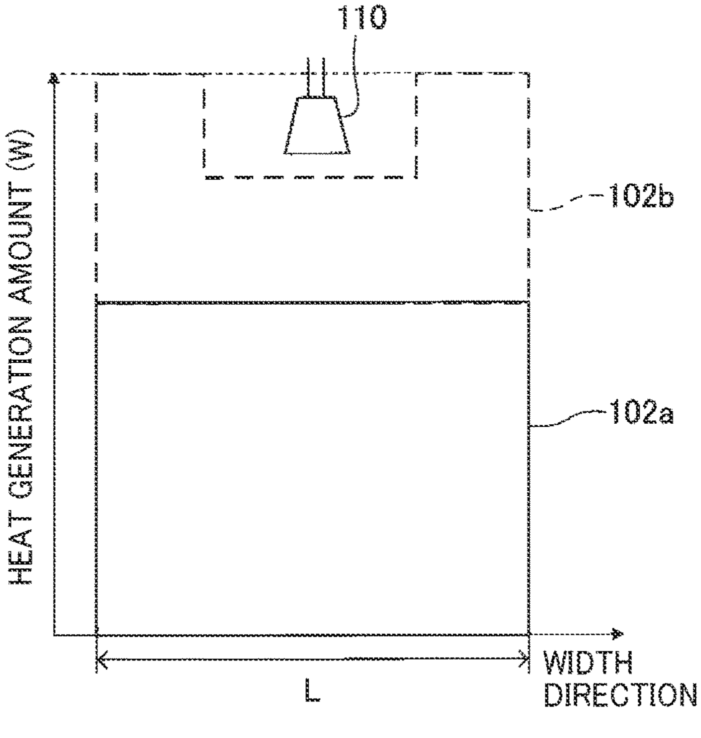
FIG. 7 is a diagram of the fixing device depicted in FIG. 6, illustrating a heat generation amount when the sub-heater is turned off.

As illustrated in FIG. 6, a total heat generation amount obtained by adding a heat generation amount of the lateral end portion 102*b*2 of the sub-heater 102*b* to a heat generation amount of a lateral end portion of the main heater 102*a* heating a lateral end span LS of the fixing belt 101 in the width direction of the fixing belt when both the sub-heater 102*b* and the main heater 102*a* are turned on is greater than a total heat generation amount obtained by adding a heat generation amount of the center portion 102*b*1 of the sub-heater 102*b* to a heat generation amount of a center portion of the main heater 102*a* heating the center span CS of the fixing belt 101. In contrast, when the sub-heater 102*b* is turned off and the main heater 102*a* is turned on, as illustrated in FIG. 7, the main heater 102*a* attains a heat generation amount that is substantially even in the width direction of the fixing belt 101, heating the fixing belt 101 substantially evenly in the width direction thereof.

Figure 8:
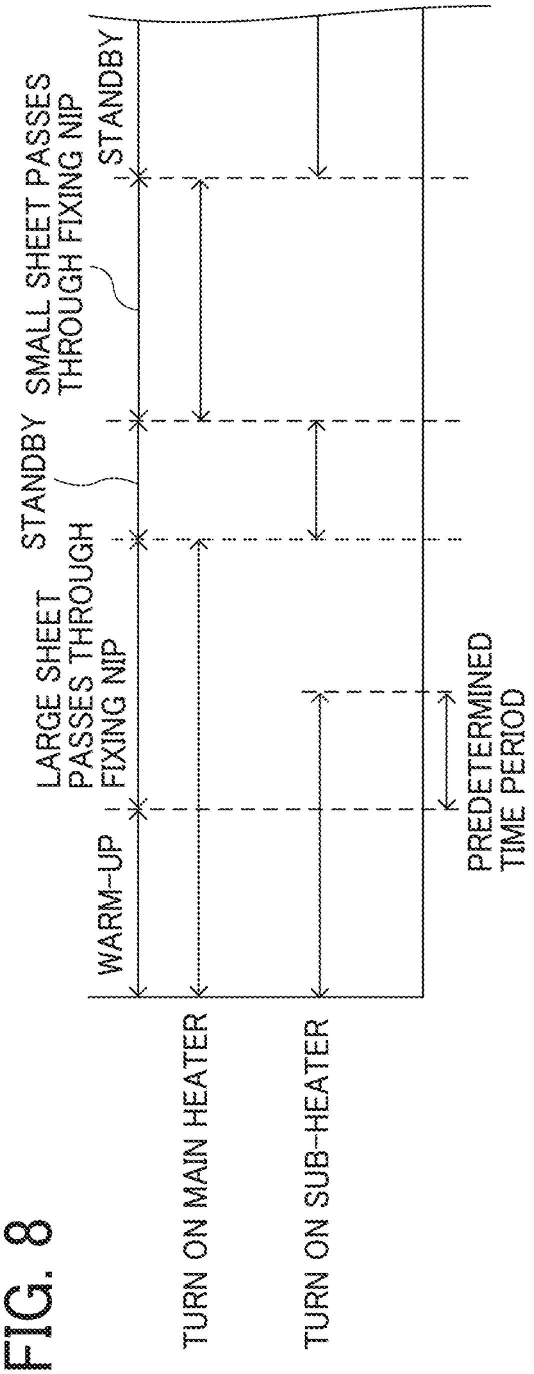
FIG. 8 is a timing chart of a control for turning on each of the main heater and the sub-heater depicted in FIG. 6 as one example.

FIG. 8 is a timing chart of a control for turning on each of the main heater 102*a* and the sub-heater 102*b* as one example.

When a power supply is turned on, the difference value between the surface temperature of the fixing belt detected by the temperature detecting sensor 110 and the target temperature (that is, the standby temperature or the fixing temperature) is equal to or larger than a predetermined value. At this time, the engine controller 152 of the control device 150 sets the required power to the total value of the rated power of the main heater 102*a* and the rated power of the sub-heater 102*b*. In other words, in a warming-up operation after the power supply is turned on, each of the sub-heater 102*b* and the main heater 102*a* is turned on at the rated power.

When the printer 200 is warmed up to heat the fixing belt 101 to the target temperature (that is, the standby temperature or the fixing temperature), the guides 451 serving as lateral end contact members draw heat from the lateral ends of the fixing belt 101 because the guides 451 include the guide portions 451*a* that contact both lateral ends of the fixing belt 101 in the width direction thereof, respectively. Both lateral ends of the fixing belt 101 in the width direction thereof slide over the guide portions 451*a*, respectively. Hence, the lateral ends of the fixing belt 101 are subject to temperature decrease in which the temperature of each of the lateral ends of the fixing belt 101 decreases compared to the temperature of the center of the fixing belt 101.

However, the engine controller 152 controlling the fixing device 100 according to the present embodiment turns on both the main heater 102*a* and the sub-heater 102*b* at the rated power when the fixing device 100 is warmed up, thus increasing a heat generation amount heating each of the lateral end spans LS of the fixing belt 101 to be larger than a heat generation amount heating the center span CS of the fixing belt 101. As a result, even if the guides 451 draw lots of heat from the lateral ends of the fixing belt 101, respectively, the above described configuration and control of fixing device 100 prevents the temperature decrease in the lateral end spans LS of the fixing belt 101. In addition, the above-described configuration and control can quickly raise the temperature of each lateral end spans LS of the fixing belt 101 in the width direction of the fixing belt 101 to the target temperature (the fixing temperature or the standby temperature) like the temperature of the center span CS of the fixing belt 101. As a result, the above-described configuration and control can shorten the warm-up time and the first print out time. In addition, the above-described configuration and control can ensure the fixing property of the toner image onto the end of the sheet firstly printed after the end of the warm-up operation.

When the large sheet passes through the fixing nip, the engine controller 152 turns on both the main heater 102*a* and the sub-heater 102*b* until a predetermined time period elapses after conveyance of the sheet starts (the start of the fixing operation). Specifically, the engine controller 152 determines the required power based on the difference value between the target temperature for fixing the toner image onto the sheet and the surface temperature of the fixing belt detected by the temperature detecting sensor 110 and sets the total value of the power turning on the sub-heater 102*b* and the power for turning on the main heater 102*a* to the required power (hereinafter referred to as a second power control). In the above, the ratio of the power for turning on the sub-heater 102*b* to the power for turning on the main heater 102*a* is experimentally and appropriately determined depending on the configuration of the image forming apparatus. The engine controller 152 may appropriately change the ratio of the power for turning on the sub-heater 102*b* to the power for turning on the main heater 102*a* based on the required power. Turning on both the sub-heater 102*b* and the main heater 102*a* as described above can prevent the fixing device from performing the fixing operation under the temperature decrease in the lateral end spans of the fixing belt and prevent occurrence of the fixing failure of the toner image at the end of the sheet in the width direction of the fixing belt. In the present embodiment, the large sheet is defined as a sheet having the width equal to or larger than 257 mm that is the width of B4 size sheet in portrait orientation, and the small sheet is defined as a sheet having the width smaller than 257 mm. However, the definition of the large sheet and the small sheet is not limited to this. The definition may be appropriately changed based on the configuration of the image forming apparatus.

When the predetermined time period elapses after the conveyance of the sheet starts (the start of the fixing operation), the engine controller 152 of the control device 150 mainly performs control of turning on the main heater 102*a*. Specifically, the engine controller 152 determines whether the required power determined based on the difference value between the target temperature for fixing the toner image onto the sheet and the surface temperature of the fixing belt detected by the temperature detecting sensor 110 is equal to or smaller than the rated power of the main heater 102*a*. In response to determining that the required power is equal to or smaller than the rated power of the main heater 102*a*, the engine controller 152 performs the control of turning on the main heater 102*a* and does not turn on the sub-heater 102*b*. In response to determining that the required power is larger than the rated power of the main heater 102*a*, the engine controller 152 performs the control of turning on both the main heater 102*a* and the sub-heater 102*b*. Hereinafter, the above-described control is referred to as a first power control.

Immediately after the start of the fixing operation, the temperature of each of the guides 451 is equal to or lower than the fixing temperature. Therefore, heat transfers from the lateral end spans of the fixing belt 101 to the guides 451. When the predetermined time period elapses, the temperature of each of the guides 451 increases to a temperature close to the fixing temperature, which reduces heat transferring from the lateral end spans of the fixing belt 101 to the guides 451. Since the length of the fixing belt 101 in the width direction is equal to or larger than the largest width of widths of the sheets available in the printer 200 as described above, the end of the fixing belt 101 does not directly contact the sheet. Therefore, the amount of heat taken away by the sheet at the lateral end spans of the fixing belt 101 is smaller than that at the center of the fixing belt 101. Accordingly, reducing the heat transferring from the lateral end span of the fixing belt 101 to the guide 451 results in the amount of heat taken away by the sheet and the guide 451 from the lateral end span of the fixing belt 101 to be substantially equal to the amount of heat taken away by the sheet from the center span of the fixing belt 101. As a result, the heat generation amount heating the lateral end span LS of the fixing belt 101 that is not larger than the heat generation amount heating the center span of the fixing belt does not cause the temperature decrease in the lateral end span LS of the fixing belt 101. Thus, the fixing belt 101 retains the fixing temperature substantially throughout the entire span of the fixing belt 101 in the width direction thereof.

The above-described first power control mainly turns on the main heater 102*a* having even heat generation distribution in the width direction of the fixing belt 101 as illustrated in FIG. 7 and substantially uniformly heats the entire span of the fixing belt 101 in the width direction thereof. As a result, the fixing belt 101 can retain the fixing temperature substantially throughout the entire span of the fixing belt 101 in the width direction thereof, which can prevent the occurrence of fixing failure on the ends of the sheet in the width direction of the fixing belt.

The heat generation distribution of the main heater 102*a* in the present embodiment is substantially even in the width direction of the fixing belt 101. Under the condition that does not cause the temperature decrease in the lateral end span of the fixing belt 101, the engine controller 152 performs the above-described first power control that mainly turns on the main heater 102*a* and does not basically turn on the sub-heater 102*b* so that the fixing belt 101 can retain the fixing temperature substantially throughout the entire span of the fixing belt 101 in the width direction thereof. The above-described configuration and control enables eliminating the lateral end temperature detecting sensor 210*b* to control turning on the sub-heater 102*b* for maintaining the lateral end span of the fixing belt at the fixing temperature, that is, reducing the number of parts from the comparative embodiment, which enables reducing manufacturing costs.

In addition, the engine controller 152 performs the first power control that mainly turns on the main heater 102*a* when the fixing device fixes the toner image onto the small sheet. That is, the engine controller 152 determines whether the required power determined based on the difference value between the target temperature for fixing the toner image onto the small sheet and the surface temperature of the fixing belt detected by the temperature detecting sensor 110 is equal to or smaller than the rated power of the main heater 102*a*. In response to determining that the required power is equal to or smaller than the rated power of the main heater 102*a*, the engine controller 152 performs the control of turning on the main heater 102*a* and does not turn on the sub-heater 102*b*. In response to determining that the required power is larger than the rated power of the main heater 102*a*, the engine controller 152 performs the control of turning on both the main heater 102*a* and the sub-heater 102*b*.

Since the toner image formed on the small sheet does not contact the lateral end spans of the fixing belt 101 on which the temperature decrease in the lateral end of the fixing belt 101 occurs, the temperature decrease does not affect the toner image on the small sheet. Accordingly, the engine controller 152 performs the first power control that mainly turns on the main heater 102*a* and does not basically turn on the sub-heater 102*b* when the fixing device fixes the toner image onto the small sheet, which can prevent overheating of the lateral end spans of the fixing belt 101 in the width direction of the fixing belt 101.

In addition, during standby, the control device 150 performs a third power control that turns on the sub-heater 102*b* and does not turn on the main heater 102*a* to maintain the temperature of the fixing belt at the standby temperature.

Since the sheet does not pass through the fixing device during standby, the sheet does not take away heat from the fixing belt during standby. However, the guides 451 take away heat from the lateral end spans of the fixing belt 101 during standby. As a result, if the engine controller 152 turns on the main heater 102*a* and does not turn on the sub-heater 102*b* based on a result detected by the temperature detecting sensor 110 that detects the temperature of the center span of the fixing belt 101 so that the fixing belt 101 retains the standby temperature, the following disadvantage may occur. That is, the above-described control gradually increases the temperature difference between the temperature in the lateral end span of the fixing belt 101 and the temperature in the center span of the fixing belt 101, and the temperature in the lateral end span of the fixing belt 101 becomes lower than the temperature in the center span of the fixing belt 101.

To avoid the above-described disadvantage, the engine controller 152 in the present embodiment performs the third power control that turns on the sub-heater 102*b* and does not turn on the main heater 102*a* during standby so that the fixing belt 101 retains the standby temperature during standby. During performing the third power control, the heat generation amount heating the lateral end span of the fixing belt 101 is larger than the heat generation amount heating the center span of the fixing belt 101. As a result, performing the third power control can prevent the temperature in the lateral end span of the fixing belt 101 from becoming lower than the temperature in the center span of the fixing belt 101 during standby. Since the sheet does not take away heat from the fixing belt during standby, turning on the sub-heater 102*b* alone can maintain the temperature of the fixing belt 101 at the standby temperature.

Figure 9:
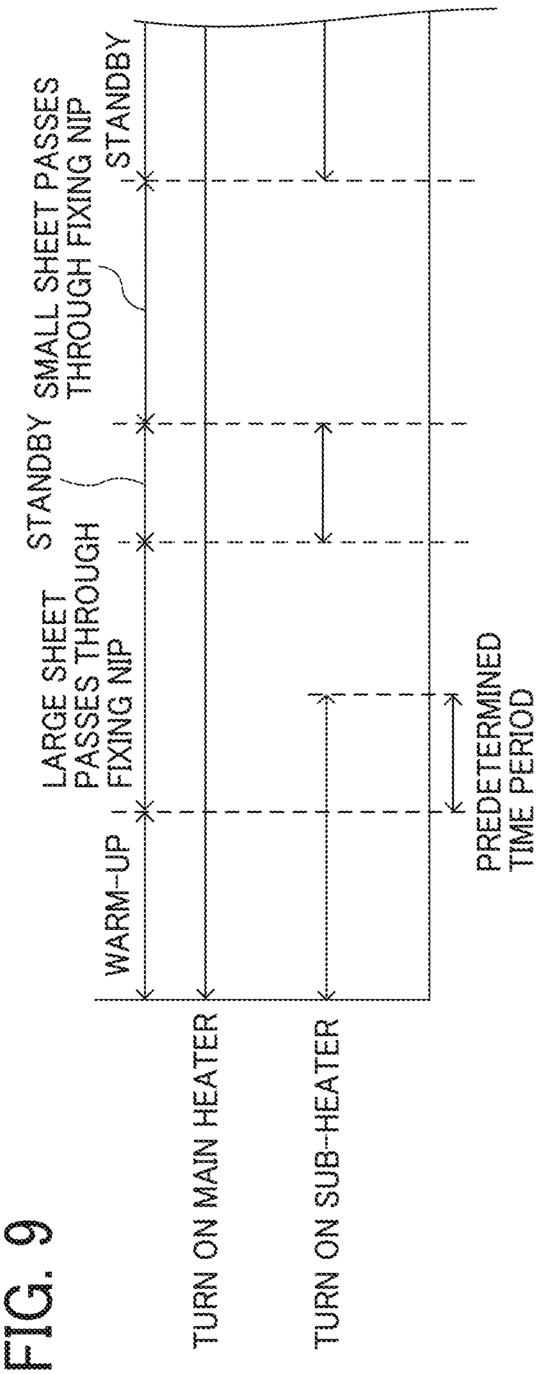
FIG. 9 is a timing chart of a control for turning on each of the main heater and the sub-heater depicted in FIG. 6 as another example.

Alternatively, the engine controller 152 may perform the second power control that turns on both the main heater 102*a* and the sub-heater 102*b* to maintain the temperature of the fixing belt 101 at the standby temperature (see FIG. 9). In the second power control that turns on both the main heater 102*a* and the sub-heater 102*b*, the heat generation amount heating the lateral end span of the fixing belt 101 is larger than the heat generation amount heating the center span of the fixing belt 101. As a result, performing the second power control can prevent the temperature in the lateral end span of the fixing belt 101 from becoming lower than the temperature in the center span of the fixing belt 101 during standby.

Alternatively, the engine controller 152 may perform a fourth power control that mainly turns on the sub-heater 102*b* to maintain the temperature of the fixing belt 101 at the standby temperature. In the fourth power control, the engine controller 152 determines whether the required power determined based on the difference value between the target temperature and the surface temperature of the fixing belt detected by the temperature detecting sensor 110 is equal to or smaller than the rated power of the sub-heater 102*b*. In response to determining that the required power is equal to or smaller than the rated power of the sub-heater 102*b*, the engine controller 152 performs the control of turning on the sub-heater 102*b* and does not turn on the main heater 102*a*. In response to determining that the required power is larger than the rated power of the sub-heater 102*b*, the engine controller 152 performs the control of turning on both the main heater 102*a* and the sub-heater 102*b*.

In a case in which the guide 451 has a large thermal capacity that prevents the temperature of the guide 451 from decreasing, the engine controller 152 may perform the first power control that mainly turns on the main heater 102*a* during standby to maintain the temperature of the fixing belt 101 at the standby temperature.

In the above description, the engine controller 152 performs the second power control that turns on both the main heater 102*a* and the sub-heater 102*b* for the predetermined time period when the fixing device fixes the toner image onto the large sheet. However, if the toner image is not in an area on the sheet corresponding to the lateral end spans of the fixing belt in which the temperature decrease occurs, the fixing failure of the toner image does not occur even when the fixing device fixes the toner image onto the large sheet. Accordingly, in a case in which no toner image exists (that is, an image area rate is zero) in reference spans extended inboard from both lateral edges of the large sheet P in the width direction thereof when the fixing device fixes the toner image onto the large sheet P, the engine controller 152 may perform the first power control that mainly turns on the main heater 102*a* similarly to a case when the fixing device fixes the toner image onto the small sheet.

Figure 10:
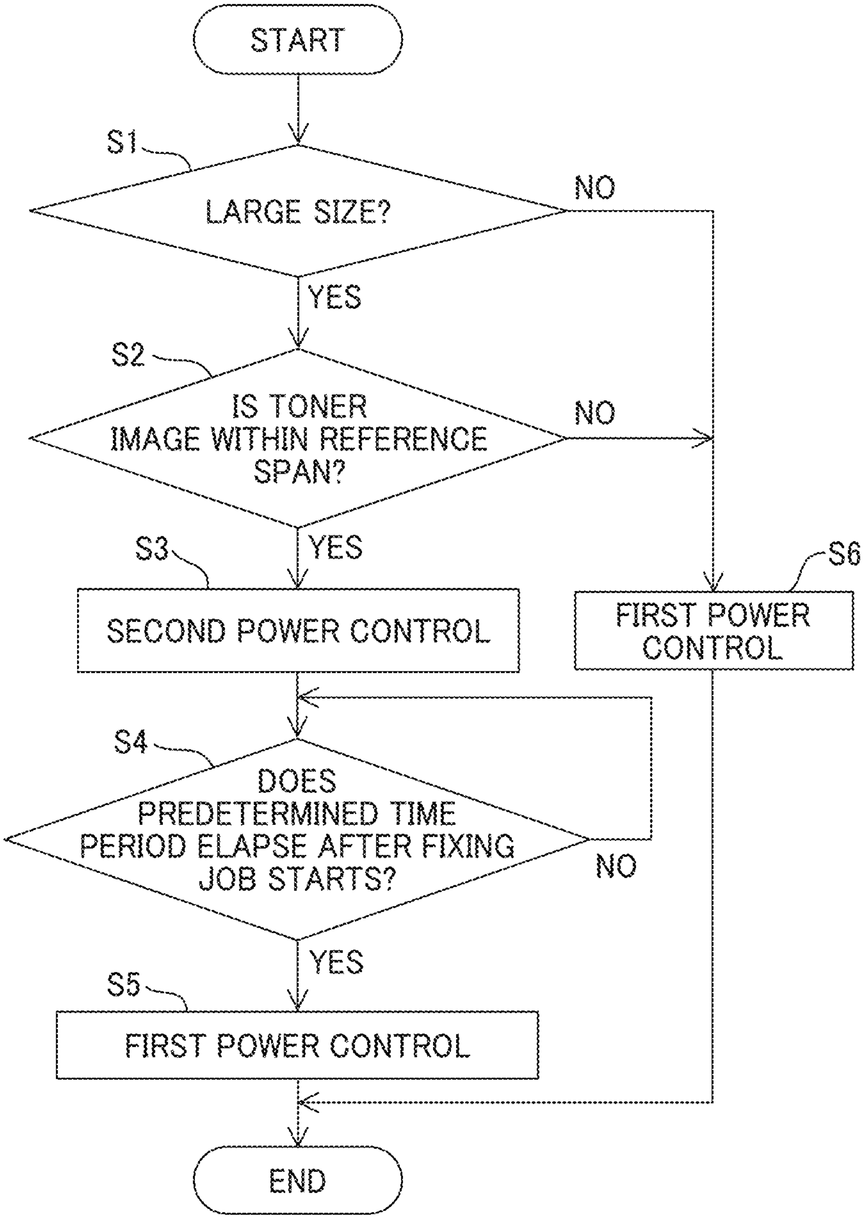
FIG. 10 is a flowchart illustrating processes of a control for turning on each of the main heater and the sub-heater during fixing.

FIG. 10 is a flowchart illustrating processes of a control for turning on each of the main heater 102*a* and the sub-heater 102*b* during the fixing operation.

In response to receiving a print instruction from an external device such as a personal computer, the control device 150 reads data relating to a size (e.g., a width) of the sheet P placed in the sheet feeder 61 from the nonvolatile flash memory. In step S1, the control device 150 determines whether or not the width of the sheet P, that is read from the nonvolatile flash memory, is a width of the large sheet. For example, according to the present embodiment, the width of the large sheet is equal to or larger than the width of the B4 size sheet in portrait orientation.

If the control device 150 determines that the width of the sheet P is a width of the small sheet that is smaller than the width of the B4 size sheet in portrait orientation (NO in step S1), the temperature decrease in the lateral end span of the fixing belt does not affect the toner image on the small sheet because the toner image does not come into contact with the lateral end spans of the fixing belt in the width direction of the fixing belt as described above. Accordingly, if the control device 150 determines that the width of the sheet P is the width of the small sheet, the control device 150 performs the first power control that mainly turns on the main heater 102*a* in step S6.

On the other hand, if the control device 150 determines that the width of the sheet P is the width of the large sheet that is equal to or larger than the width of the B4 size sheet in portrait orientation (YES in step S1), the control device 150 checks whether the toner image is within at least one of the reference spans extended inboard from the lateral edges of the sheet P in the width direction thereof based on image data to form the toner image on the sheet in step S2. In the case of NO in step S2, that is, the case in which the toner image is formed on the large sheet but not formed in the area corresponding to the lateral end spans of the fixing belt in the width direction of the fixing belt in which the temperature decrease occurs, the control device 150 performs the first power control that mainly turns on the main heater 102*a* in step S6.

Each of the reference spans extended inboard from the lateral edges of the sheet P in the width direction thereof, in which the temperature decrease in the lateral end spans of the fixing belt causes the fixing failure, varies depending on the size (e.g., the width) of the sheet P. To address this circumstance, the engine controller 152 changes the reference span according to the size of the sheet P as indicated in table 1 below.

TABLE 1

| Width of sheet | Imaging span |
|---|---|
| A | No image within a span of X mm from a lateral edge of a sheet in a width direction thereof |
| B | No image within a span of X + Y mm from a lateral edge of a sheet in a width direction thereof |

In the case of YES in step S2, that is, the case in which the control device 150 determines that the toner image is within at least one of the reference spans extended inboard from the lateral edges of the sheet P in the width direction thereof, the control device 150 performs the second power control that turns on both the sub-heater 102*b* and the main heater 102*a* in step S3. In step S4, the control device 150 determines whether the predetermined time period elapses after the fixing operation starts, that is, after the control device 150 turns on both the main heater 102*a* and the sub-heater 102*b*. If the control device 150 determines that the predetermined time period elapses after the fixing operation starts (YES in step S4), the control device 150 stops the second power control and performs the first power control that mainly turns on the main heater 102*a* in step S5 because the guides 451 are heated to the temperature close to the fixing temperature, thus decreasing conduction of heat from both lateral ends of the fixing belt 101 in the width direction thereof to the guides 451, respectively.

The predetermined time period for switching from the second power control to the first power control is preferably changed in accordance with the width of the sheet passing through the fixing nip N.

Figure 11:
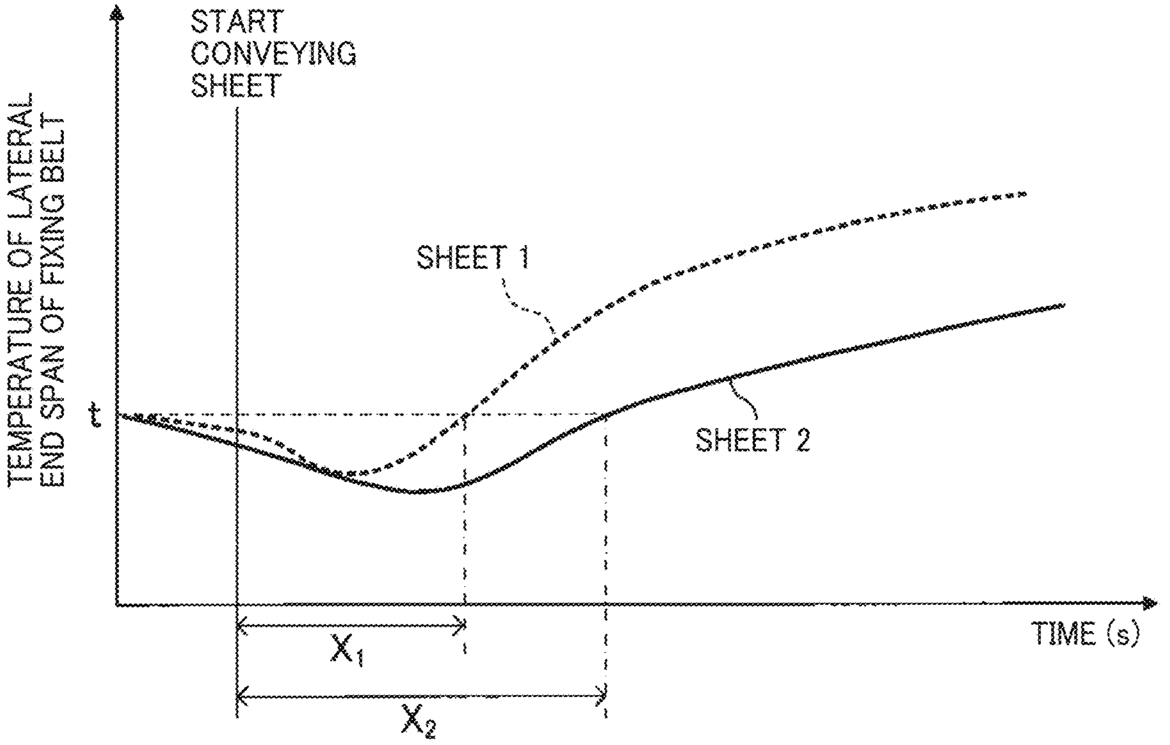
FIG. 11 is a graph illustrating temperature change of a fixing belt incorporated in the fixing device depicted in FIG. 2 in a lateral end span of the fixing belt in a width direction thereof.

FIG. 11 is a graph illustrating temperature change of the lateral end span of the fixing belt in the width direction thereof.

As illustrated in FIG. 11, the engine controller 152 turns on both the sub-heater 102*b* and the main heater 102*a* to heat the fixing belt 101 to a fixing temperature t. Thereafter, the engine controller 152 turns off the sub-heater 102*b*. Thus, the temperature of the lateral end span of the fixing belt 101 changes when sheets 1 and 2 are conveyed through the fixing nip N. Each of the sheets 1 and 2 has a width equal to or larger than the width of 257 mm of the B4 size sheet in portrait orientation. The width of the sheet 1 is different from the width of the sheet 2.

When the sheet 1 smaller than the sheet 2 in the width is conveyed through the fixing nip N, the sheet 1 draws heat less than the sheet 2 from both lateral end spans of the fixing belt 101. Hence, the sheet 1 causes an amount of heat conducted from both lateral end spans LS of the fixing belt 101 to the guides 451 to be greater than that caused by the sheet 2. Accordingly, the guides 451 are heated to the temperature close to the fixing temperature t in a shortened time period. Consequently, the lateral end spans of the fixing belt 101 recover the fixing temperature t in the shortened time period, eliminating temperature decrease of the fixing belt 101 in the lateral end spans. For example, when X1 seconds elapse after conveyance of the sheet 1 through the fixing nip N starts, even if the engine controller 152 turns on the main heater 102*a* and does not turn on the sub-heater 102*b*, temperature decrease in the lateral end spans LS of the fixing belt 101 does not occur.

On the other hand, when the sheet 2 greater than the sheet 1 in the width is conveyed through the fixing nip N, the sheet 2 draws heat more than the sheet 1 from the lateral end spans LS of the fixing belt 101. Hence, conduction of heat from the lateral end spans of the fixing belt 101 to the guides 451, respectively, decreases. Accordingly, heat is conducted from the lateral end spans of the fixing belt 101 to the guides 451, respectively, for an increased time period, taking time for the lateral end spans of the fixing belt 101 to recover the fixing temperature t. For example, when X2 seconds that are longer than X1 seconds elapse after conveyance of the sheet 2 through the fixing nip N starts, even if the engine controller 152 turns on the main heater 102*a* and does not turn on the sub-heater 102*b*, temperature decrease in the lateral end spans of the fixing belt 101 does not occur.

As described above, a time period taken to eliminate temperature decrease in the lateral end spans of the fixing belt 101 when the engine controller 152 turns on the main heater 102*a* and does not turn on the sub-heater 102*b* varies depending on the width of the sheet P conveyed through the fixing nip N. Hence, as illustrated in table 2 below, the predetermined time period that elapses after the engine controller 152 turns on the sub-heater 102*b* until the engine controller 152 turns off the sub-heater 102*b* is preferably changed according to the width of the sheet P.

TABLE 2

| Width of sheet | Predetermined time period |
|---|---|
| A | X seconds |
| B(A < B) | X + Y seconds |

The predetermined time period that elapses after the engine controller 152 turns on the sub-heater 102*b* until the engine controller 152 turns off the sub-heater 102*b* during the fixing operation is preferably changed between a first image formation after the printer 200 is powered on and a later image formation after the printer 200 enters the standby mode. For example, when the printer 200 is powered on, the guides 451 including the guide portions 451*a* that are in contact with both lateral ends of the fixing belt 101 in the width direction of the fixing belt, respectively, have a substantially ambient temperature. Hence, it takes longer time for the guides 451 to be heated to the temperature close to the fixing temperature by conduction of heat from the lateral end spans of the fixing belt 101 to the guides 451 compared to the later image formation after the printer 200 enters the standby mode. Accordingly, during the first image formation after the printer 200 is powered on, the engine controller 152 increases the predetermined time period for the second power control that turns on the main heater 102*a* and the sub-heater 102*b* compared to the later image formation after the printer 200 enters the standby mode.

As described above, the engine controller 152 determines whether or not the toner image is within at least one of the reference spans extended inboard from the lateral edges of the sheet P in the width direction thereof, respectively, and determines whether the engine controller 152 performs the first power control that mainly turns on the main heater 102*a* or the second power control that turns on both the main heater 102*a* and the sub-heater 102*b*. Alternatively, the engine controller 152 may determine turning on of the sub-heater 102*b* and the main heater 102*a* as described below. For example, based on a distance from the lateral edge of the fixing belt 101 to a lateral edge of the toner image on the sheet P in the width direction of the fixing belt 101, the engine controller 152 may determine whether the engine controller 152 performs the first power control or the second power control.

As described above, if the engine controller 152 determines that the toner image is within at least one of the reference spans extended inboard from the lateral edges of the sheet P in the width direction thereof, respectively, for example, if the image area rate in at least one of the reference spans on the sheet P is greater than zero, the engine controller 152 performs the second power control that turns on both the sub-heater 102*b* and the main heater 102*a*. However, the lateral end spans of the fixing belt 101 may barely suffer from temperature decrease depending on the configuration of the image forming apparatus. In the above-described image forming apparatus, the engine controller may perform the second power control, for example, in response to determining that the image area rate in the reference span extended inboard from the lateral edge of the sheet P in the width direction thereof is equal to or greater than a predetermined value. Even if the toner image is within the reference span extended inboard from the lateral edge of the sheet P in the width direction thereof, the toner image having a small image rate draws slight heat from the fixing belt 101. Accordingly, even if the lateral end spans of the fixing belt 101 suffer from temperature decrease, the fixing belt 101 fixes the toner image on the sheet P properly in the reference span extended inboard from the lateral edge of the sheet P in the width direction thereof.

The fixing device 100 may include a power interrupter that interrupts power supply to the sub-heater 102*b* and the main heater 102*a* when the power interrupter detects an abnormal temperature of the surface of the fixing belt 101.

The power interrupter is a thermopile, a thermal fuse, or the like. The power interrupter may include an abnormal temperature detecting sensor serving as an abnormal temperature detector such as a thermopile that is inferior to the temperature detecting sensor 110 in temperature responsiveness and is manufactured at reduced costs. The power interrupter interrupts power supply to the sub-heater 102*b* and the main heater 102*a* based on a detection result sent from the abnormal temperature detecting sensor.

The thermopile, the thermal fuse, or the abnormal temperature detecting sensor is disposed opposite the fixing belt 101. When the fixing belt 101 is heated to a predetermined temperature, the power interrupter is activated and interrupts power supply to the sub-heater 102*b* and the main heater 102*a*.

Figure 12:
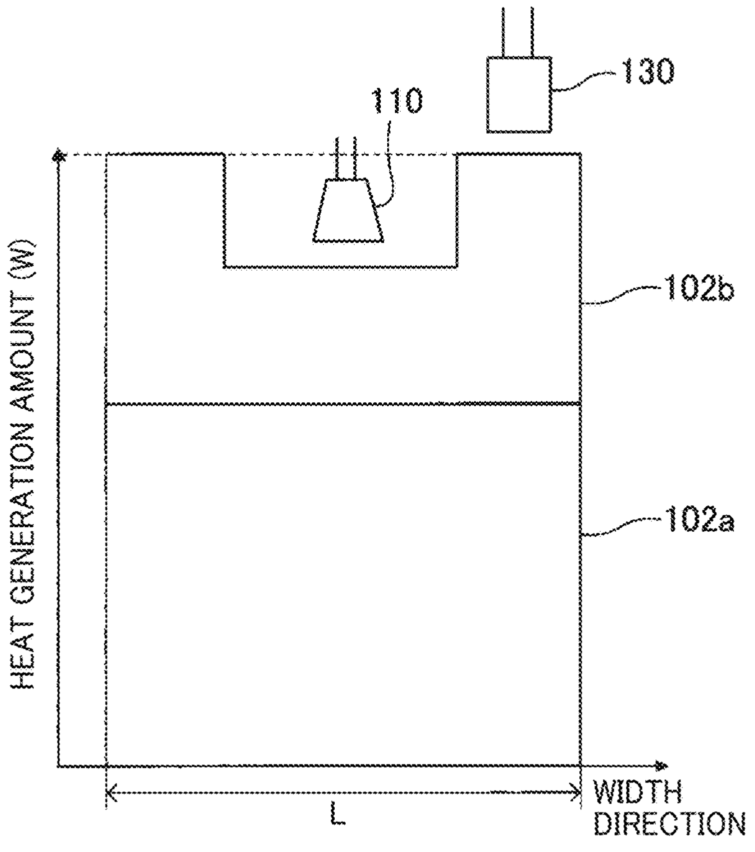
FIG. 12 is a diagram of the fixing device depicted in FIG. 6, illustrating a power interrupter disposed opposite the lateral end span of the fixing belt in the width direction of the fixing belt.

FIG. 12 illustrates a power interrupter 130 (e.g., the thermopile, the thermal fuse, or the abnormal temperature detecting sensor) that is disposed opposite the lateral end span of the fixing belt 101. The lateral end span of the fixing belt 101 receives heat in an increased amount when the main heater 102*a* and the sub-heater 102*b* are turned on and therefore is subject to temperature increase. The lateral end span of the fixing belt 101 is also subject to the temperature increase when the fixing device fixes the toner image onto the small sheet. Accordingly, the power interrupter 130 disposed opposite the lateral end span of the fixing belt 101 can detect an abnormal temperature of the fixing belt 101 early and interrupt power supply to each of the main heater 102*a* and the sub-heater 102*b*.

In the present embodiment, continuously printing the toner images on a great number of small sheets tends to cause a higher temperature of each of the lateral end spans of the fixing belt 101 than a temperature of the center span of the fixing belt 101. Since the small sheets that pass through the fixing nip N successively are conveyed over the center span of the fixing belt 101, the small sheets draw heat from the center span of the fixing belt 101. On the other hand, the small sheets P barely draw heat from the lateral end spans of the fixing belt 101. Accordingly, after the guides 451 are heated to the temperature close to the fixing temperature, heat given by the main heater 102*a* and drawn by the small sheets and other components in the lateral end spans of the fixing belt 101 is less than that in the center span of the fixing belt 101. As a result, continuously printing the toner images on the great number of small sheets tends to cause the higher temperature of each of the lateral end spans of the fixing belt 101 than the temperature of the center span of the fixing belt 101.

To prevent the temperature of each of the lateral end spans of the fixing belt 101 from increasing, a thermal equalizer may be interposed between the pad 106 and the inner circumferential surface of the fixing belt 101. The thermal equalizer facilitates conduction of heat in a longitudinal direction thereof and decreases unevenness of the temperature of the fixing belt 101 in a longitudinal direction, that is, the width direction of the fixing belt. The thermal equalizer conducts heat from the lateral end spans to the center span of the fixing belt 101. Accordingly, the thermal equalizer suppresses temperature decrease in the center span of the fixing belt 101 and suppresses temperature increase in the lateral end spans of the fixing belt 101. Since the thermal equalizer suppresses temperature decrease in the center span of the fixing belt 101, while the engine controller 152 performs a control to retain the fixing belt 101 at the fixing temperature based on a detection result sent from the temperature detecting sensor 110, the thermal equalizer enables reducing a lighting amount per unit time of the main heater 102*a*. In addition, the thermal equalizer can reduce a heating amount per unit time of heat supplied to the lateral end spans of the fixing belt 101, thus, suppressing temperature increase in the lateral end spans of the fixing belt 101.

The thermal equalizer eliminates temperature decrease in the lateral end spans of the fixing belt 101 quickly, shortening a lighting time period for which the engine controller 152 turns on both the main heater 102*a* and the sub-heater 102*b* when the large sheet passes through the fixing nip N. Thus, the thermal equalizer reduces power consumption of the fixing device 100.

Under a low-temperature environment and a condition in which the amount of heat taken away from the fixing belt 101 per unit time is large, for example, a condition in which the sheet to be passed is a thick sheet, the temperature of the fixing belt 101 decreases greatly when the sheet is passed. As a result, the difference between the temperature of the fixing belt detected by the temperature detecting sensor 110 and the target temperature (that is, the fixing temperature) becomes large, and the determined required power may exceed the rated power of the main heater 102*a*.

In this case, the engine controller 152 in the present embodiment turns on the sub-heater 102*b* in addition to the main heater 102*a* to satisfy the required power. As a result, the temperature of the fixing belt 101 can be recovered to the fixing temperature by a predetermined period, and fixing can be performed without decreasing productivity. Supplying the rated power to the main heater 102*a* and power corresponding to the difference between the required power and the rated power of the main heater 102*a* to the sub-heater 102*b* has the following advantage. That is, as compared with the case in which the sub-heater 102*b* is turned on at the rated power, supplying power to the main heater 102*a* and the sub-heater 102*b* as described above can reduce the temperature increase in the lateral end spans of the fixing belt 101.

The resistance value of the sub-heater 102*b* is different from the resistance value of the main heater 102*a*. Amounts of heat given to the center span of the fixing belt 101 with respect to the power turning on the main heater 102*a* and the sub-heater 102*b* are also different from each other. For this reason, the engine controller 152 may calculate a power value obtained by multiplying a difference between the required power and the rated power of the main heater 102*a* by a predetermined coefficient and supply the power having the power value to the sub-heater 102*b*. The above-described control can accurately control the temperature of the fixing belt 101.

Preferably, the rated power of the main heater 102*a* is larger than the rated power of the sub-heater 102*b*. For example, in the case that the rated power of the main heater 102*a* is 500 W, the rated power of the sub-heater 102*b* is 500 W, and the required power is 800 W, the engine controller 152 calculates 300 W as the power turning on the sub-heater 102*b* in the first power control and turns on the sub-heater 102*b*. On the other hand, in the case that the rated power of the main heater 102*a* is 700 W that is 200 W higher than the rated power (500 W) of the sub-heater 102*b*, the power turning on the sub-heater 102*b* is reduced to 100 W. As a result, increasing the rated power of the main heater 102*a* can reduce the difference between the total heat generation amount of the main heater 102*a* and the sub-heater 102*b* for heating the center span of the fixing belt in the width direction and the total heat generation amount of the main heater 102*a* and the sub-heater 102*b* for heating the lateral end spans of the fixing belt in the width direction, which prevents occurrence of the abnormally high temperature at the lateral end span of the fixing belt.

The main heater 102*a* preferably has the rated power equal to or larger than the maximum required power for fixing the toner image onto the small sheet after an initial stage of printing when the engine controller 152 performs the first power control. The above-described rated power of the main heater 102*a* enables fixing the toner image onto a small thick sheet under the low temperature environment after the initial stage of printing without substantially turning on the sub-heater 102*b*. Even if the sub-heater 102*b* is turned on after the initial stage of printing, the power turning on the sub-heater 102*b* can be reduced to be little power. As a result, the above-described rated power of the main heater 102*a* can favorably suppress the occurrence of the abnormally high temperature in the lateral end span of the fixing belt 101 when the small thick sheets continuously pass through the fixing device under the low temperature environment and enables performing the fixing operation without decreasing the productivity.

The maximum required power for fixing the toner image onto the small sheet after the initial stage of printing when the engine controller 152 performs the first power control is a required power to fix the toner image onto a thick sheet under the low temperature environment. In the present embodiment, the maximum required power after the initial stage of printing is 800 W, and the rated power of the main heater 102*a* is 800 W. The rated power of the sub-heater 102*b* is set to power that can maintain the temperature in the lateral end spans of the fixing belt 101 that can fix the toner image onto the large sheet in the initial stage of printing. In the present embodiment, the rated power of the sub-heater may be 500 to 600 W. The sub-heater 102*b* having the same rated power as that of the main heater 102*a* may increase the cost of the fixing device.

Figure 13:
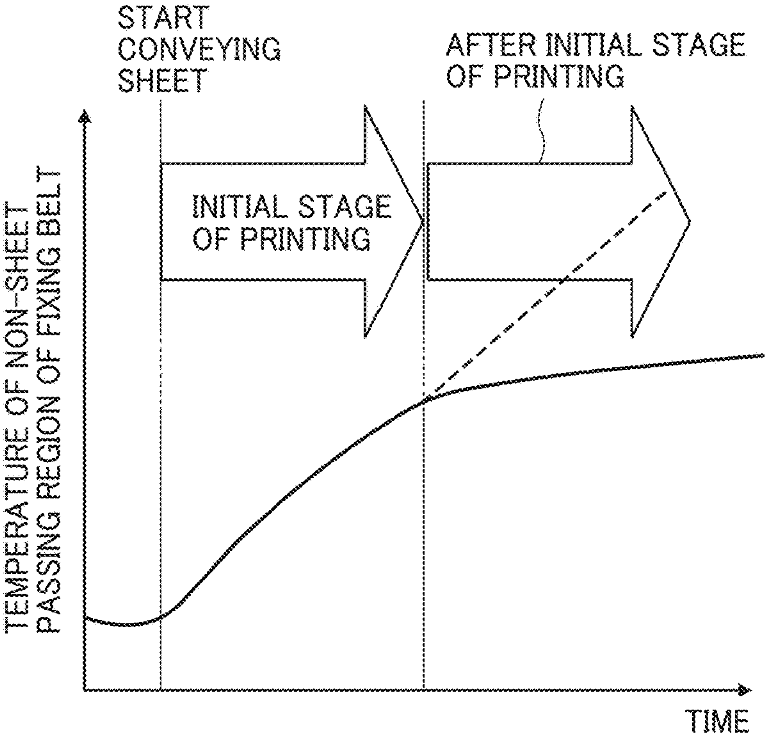
FIG. 13 is a graph illustrating temperature change of the fixing belt incorporated in the fixing device depicted in FIG. 2 in the lateral end span of the fixing belt in the width direction thereof when small thick sheets continuously pass through the fixing device in a low temperature environment.

FIG. 13 is a graph illustrating temperature change in the lateral end span of the fixing belt 101 in the width direction thereof when small thick sheets continuously pass through the fixing device under the low temperature environment. Table 3 below lists the rated powers of the main heater 102*a* and the sub-heater 102*b* in the present embodiment. Table 3 also lists the required power, the power turning on the main heater 102*a*, and the power turning on the sub-heater 102*b* at the initial stage of printing when the fixing device continuously fixes the toner images onto the small thick sheets under the low temperature environment in the present embodiment. In addition, Table 3 lists the required power, the power turning on the main heater 102*a*, and the power turning on the sub-heater 102*b* after the initial stage of printing when the fixing device continuously fixes the toner images onto the small thick sheets under the low temperature environment in the present embodiment. The broken line in FIG. 13 indicates change of the temperature at the lateral end span of the fixing belt in the case that the rated power of the main heater 102*a* is lower than the required power even after the initial stage of printing.

TABLE 3

| | | | |
|---|---|---|---|
| The ratio of the power | Rated power | Rated power of the main heater (W) | 800 |
| | | Rated power of the sub-heater (W) | 500 |
| turning on the main heater to the power turning on the sub-heater in the present embodiment | | Total power (W) | 1300 |
| | Initial stage of printing | Required power (W) | 1000 |
| | | Power supplied to the main heater during printing (W) | 800 |
| | | Power supplied to the sub-heater during printing (W) | 200 |
| | After initial stage of printing | Required power (W) | 800 |
| | | Power supplied to the main heater during printing (W) | 800 |
| | | Power supplied to the sub-heater during printing (W) | 0 |

As listed in Table 3, in the present embodiment, the rated power of the main heater 102*a* is 800 W, and the rated power of the sub-heater 102*b* is 500 W. The rated power of the main heater 102*a* is 1.5 times or more the rated power of the sub-heater 102*b*.

At the initial stage of printing, since the fixing device is not sufficiently warmed, a heat radiation amount of the fixing belt 101 increases, and the temperature of the fixing belt 101 largely drops. As a result, as listed in Table 3, the required power at the initial stage of printing becomes larger than the required power after the initial stage of printing. The required power at the initial stage of printing is 1000 W as illustrated in Table 3 and exceeds the rated power of the main heater 102*a*. Therefore, the engine controller 152 turns on the main heater 102*a* at the rated power (800 W) and turns on the sub-heater 102*b* at 200 W that is the difference between the required power and the rated power of the main heater 102*a*. As a result, at the initial stage of printing, the amount of heat applied to the lateral end spans of the fixing belt 101 is larger than the amount of heat applied to the center span of the fixing belt 101.

However, since the fixing device 100 is not warmed at the initial stage of printing, a large amount of heat transfers from the lateral end span of the fixing belt 101 to parts around the fixing belt 101. As a result, as illustrated in FIG. 13, the temperature of the lateral end span of the fixing belt 101 is sufficiently low at the initial stage of printing. Accordingly, turning on both the main heater 102*a* and the sub-heater 102*b* at the initial stage of printing does not cause the abnormally high temperature in the lateral end span of the fixing belt 101.

After the initial stage of printing, the fixing device is sufficiently warmed, the heat radiation amount of the fixing belt 101 decreases, and the temperature drop of the fixing belt 101 decreases. As a result, as illustrated in Table 3, the required power decreases from 1000 W to 800 W after the initial stage of printing and becomes equal to or smaller than the rated power of the main heater 102*a*. Therefore, the engine controller 152 can substantially turn off the sub-heater 102*b* after the initial stage of printing and mainly turns on the main heater 102*a* to maintain the temperature of the fixing belt 101 at the fixing temperature. Even if the required power exceeds the rated power of the main heater 102*a* for some reason after the initial stage of printing, the power turning on the sub-heater 102*b* is small. The engine controller 152 that periodically determines the required power most likely to determine the required power smaller than the rated power of the main heater 102*a* in the next period. As a result, the above-described configuration and control prevents the temperature in the lateral end span of the fixing belt 101 from increasing to the abnormally high temperature. The above-described configuration and control does not decrease productivity to avoid increase in the temperature of the lateral end span of the fixing belt that occurs when the small thick sheets pass through the fixing device.

Setting the rated power of the main heater 102*a* to the maximum required power (800 W) after the initial stage of printing has the following advantage as compared with setting the rated power of the main heater 102*a* to the maximum required power (1000 W) at the initial stage of printing. If a rated power of a heater is large, a voltage drop in a commercial power of a user's office or the like may drop, which may cause a flicker in a small illumination of the user's office or the like. Reducing the rated power of the main heater 102*a* to the maximum required power (800 W) after the initial stage of printing prevents the occurrence of flickers in the user's office or the like.

When the temperature is not low or when the small sheet passing through the fixing device is not thick, the difference between the temperature of the fixing belt 101 and the target temperature (that is, the fixing temperature) is smaller than that when the thick sheet passes through the fixing device under the low temperature. As a result, the required power is equal to or less than 800 W. Therefore, in the present embodiment, the engine controller 152 does not basically turn on the sub-heater 102*b* and turns on the main heater 102*a* when the temperature is not low or when the small sheet passing through the fixing device is not thick.

When the fixing device fixes the toner image onto a thick large sheet under the low temperature environment, the required power at the initial stage of printing is 1000 W that is the same power as the required power listed in Table 3. When the fixing device fixes the toner image onto the large sheet, the engine controller 152 performs the second power control at the initial stage of printing and turns on the sub-heater 102*b* at the rated power that is 500 W and the main heater 102*a* at 500 W. The engine controller 152 controls the main heater 102*a* and the sub-heater 102*b* so as to turn on at the same power. Setting the power turning on the sub-heater 102*b* larger than the power listed in Table 3 at the initial stage of printing the large sheet increases a total amount of heat supplied by the main heater 102*a* and the sub-heater 102*b* to each of the lateral end spans of the fixing belt 101 to be larger than a total amount of heat supplied by the main heater 102*a* and the sub-heater 102*b* to the center span of the fixing belt 101. The above-described setting can prevent temperature drop in each of the lateral end spans of the fixing belt 101. As a result, the above-described setting can prevent the occurrence of fixing failure of the toner image on an end portion of the sheet facing each of the lateral end spans of the fixing belt 101 in the width direction. Subsequently, after the initial stage of printing, the engine controller 152 performs the first power control that mainly turns on the main heater 102*a*.

Setting the rated power of the sub-heater 102*b* to the power (500 W) set in the second power control performed when the fixing device fixes the toner image onto the large thick sheet under the low temperature environment prevents the rated power of the sub-heater 102*b* from increasing and the occurrence of fixing failure on the end portion of the sheet in the width direction when the fixing device fixes the toner image onto the large thick sheet under the low temperature environment.

In the present embodiment, the rated power of the main heater 102*a* is set to 800 W, and the rated power of the sub-heater 102*b* is set to 500 W. Setting the rated power of the main heater 102*a* to be 1.5 times or more of the rated power of the sub-heater 102*b* prevents the rated power of each of the main heater 102*a* and the sub-heater 102*b* from increasing, the occurrence of the fixing failure of the toner image on the end portion of the sheet in the width direction, and the occurrence of the abnormally high temperature in the lateral end span of the fixing belt when the fixing device fixes the toner image onto the small thick sheet under the low temperature environment.

Figure 14:
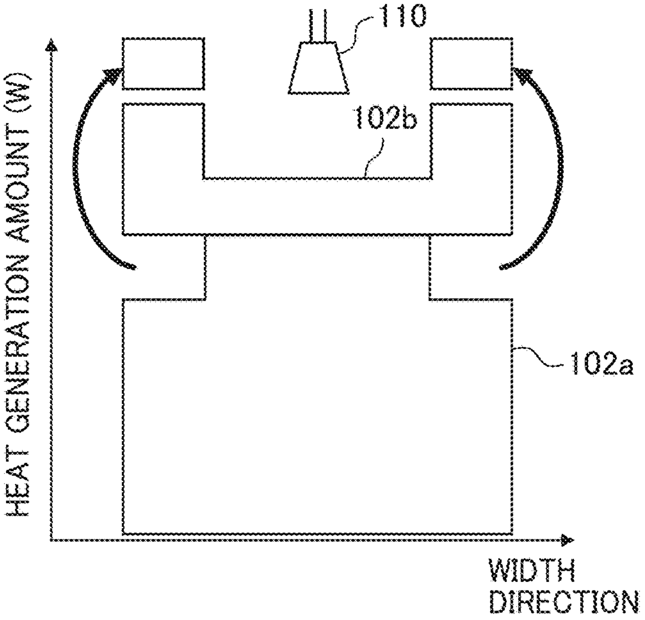
FIG. 14 is a diagram of the fixing device according to a variation, illustrating a configuration of a main heater and a sub-heater incorporated therein.

With reference to FIG. 14, the following describes a variation of the present embodiment. FIG. 14 illustrates a configuration of the main heater 102*a* and the sub-heater 102*b* in the fixing device according to the variation.

As illustrated in FIG. 14, the fixing device according to the variation includes the main heater 102*a* having a heat generation distribution in which the amount of heat generated in each of the lateral end portions of the main heater 102*a* in the width direction is smaller than the amount of heat generated in the center portion of the main heater 102*a*, and the sub-heater 102*b* having a heat generation distribution in which the amount of heat generated in each of the lateral end portions of the sub-heater 102*b* in the width direction is larger than the amount of heat generated in the center portion of the sub-heater 102*b* in the width direction. The center portion of the sub-heater 102*b* generates a predetermined amount of heat, and each of the lateral end portions of the main heater 102*a* generates a predetermined amount of heat.

In the variation, the amount of heat generated in each of the lateral end portions of the sub-heater 102*b* is larger than the amount of heat generated in each of the lateral end portions of the sub-heater in the present embodiment by the difference between the amount of heat generated in the center portion of the main heater in the variation and the amount of heat generated in each of the lateral end portions of the main heater in the variation. Therefore, the total amounts of heat generated by the sub-heater and the main heater at positions in the width direction in the variation are the same as the total amounts of heat generated by the sub-heater and the main heater at positions in the width direction in the present embodiment illustrated in FIG. 6.

In the variation, the rated power of the main heater 102*a* is set to the same level (for example, 500 W) as the rated power of the sub-heater 102*b*.

The following describes how the engine controller in the variation turns on the main heater and the sub-heater when the fixing device according to the variation fixes the toner image onto the small thick sheet under the low temperature environment. The rated power of each of the main heater and the sub-heater is 500 W as an example.

The engine controller in the variation also performs the first power control when the small sheet passes through the fixing device. In the case of the required power of 1000 W at the initial stage of printing, the engine controller turns on both the main heater 102*a* and the sub-heater 102*b* at the rated power. Turning on both the main heater 102*a* and the sub-heater 102*b* increases the amount of heat generated by the main heater 102*a* and the sub-heater 102*b* that heats each of the lateral end spans of the fixing belt, but as described in the embodiment, the temperature in each of the lateral end spans of the fixing belt does not reach the abnormally high temperature. When the required power becomes 800 W after the initial stage of printing, the engine controller turns on the main heater 102*a* at the rated power 500 W and the sub-heater 102*b* at 300 W. However, in the variation, the amount of heat generated by each of the lateral end portions of the main heater 102*a* is smaller than the amount of heat generated by the center portion of the main heater 102*a* as illustrated in FIG. 14. In addition, an amount of heat generated by each of the lateral end portions of the sub-heater 102*b* turned on at 300 W is smaller than an amount of heat generated by each of the lateral end portions of the sub-heater 102*b* turned on at the rated power. The above-described configuration and control prevents a sum of the amount of heat generated by one of lateral end portions of the main heater 102*a* and the amount of heat generated by one of the lateral end portions of the sub-heater 102*b* from becoming larger than a sum of the amount of heat generated by the center portion of the main heater 102*a* and the amount of heat generated by the center portion of the sub-heater 102*b*. As a result, the above-described configuration and control prevents the occurrence of the abnormally high temperature in the lateral end span of the fixing belt even if the engine controller turns on both the main heater 102*a* and the sub-heater 102*b* while the small sheet passes through the fixing device.

In the variation, using the main heater 102*a* having the heat generation distribution in which the amount of heat generated by each of the lateral end portions of the main heater 102*a* is smaller than the amount of heat generated by the center portion of the main heater 102*a* enables reducing the rated power of the main heater 102*a*. Reducing the rated power favorably prevents the occurrence of flicker in the user's office or the like. In addition, the above-described configuration can prevent the occurrence of the abnormally high temperature in the lateral end span of the fixing belt when the fixing device fixes the toner images onto the small thick sheets under the low temperature environment.

The engine controller in the variation performs a different control for turning on each of the main heater and the sub-heater from the control described in the present embodiment when the large sheet passes through the fixing nip. In the embodiment, the engine controller performs the first power control that mainly turns on the main heater after the predetermined time has passed from the start of moving the sheet (the start of the fixing operation) when the large sheet passes through the fixing nip. However, the heat generation distribution of the main heater 102*a* of the variation cannot maintain the temperature in the lateral end span of the fixing belt 101 at the fixing temperature if the engine controller performs the first power control after the predetermined time has passed from the start of moving the sheet (the start of the fixing operation) when the large sheet passes through the fixing nip. As a result, the fixing failure of the toner image occurs on the end portion of the sheet in the width direction.

For this reason, the engine controller in the variation performs the control for turning on each of the main heater and the sub-heater as follows when the large sheet passes through the fixing nip. That is, until the predetermined time passes from the start of moving the sheet (the start of the fixing operation), the engine controller sets the ratio of the power of the main heater and the power of the sub-heater to the required power such that the total amount of heat generated by the main heater 102$a$ and the sub-heater 102$b$ to heat each of lateral end spans of the fixing belt is larger than the total amount of heat generated by the main heater 102$a$ and the sub-heater 102$b$ to heat the center span of the fixing belt. After the predetermined time has passed, the engine controller changes the ratio of the power of the main heater and the power of the sub-heater to the required power to a ratio at which the total amount of heat generated by the main heater 102$a$ and the sub-heater 102$b$ becomes uniform in the width direction. For example, until the predetermined time passes from the start of moving the sheet (the start of the fixing operation), the engine controller increases the ratio of the power of the sub-heater to the required power such that the total amount of heat generated by the main heater 102$a$ and the sub-heater 102$b$ to heat each of lateral end spans of the fixing belt is larger than the total amount of heat generated by the main heater 102$a$ and the sub-heater 102$b$ to heat the center span of the fixing belt. After the predetermined time has passed, the engine controller increases the ratio of the power of the main heater to the required power and decreases the heat generated by the sub-heater. As a result, the total amount of heat generated by the main heater 102$a$ and the sub-heater 102$b$ becomes even in the width direction.

Even when the main heater 102$a$ has the heat generation distribution in which the amount of heat generated by the lateral end portion of the main heater 102$a$ in the width direction of the fixing belt is smaller than the amount of heat generated by the center portion of the main heater 102$a$ in the width direction, appropriately setting the ratio of the power of the main heater and the power of the sub-heater to the required power can substantially uniform the total amounts of heat generated by the sub-heater and the main heater to heat the fixing belt at positions in the width direction. Thus, based on the results detected by the temperature detecting sensor facing the center of the fixing belt in the width direction, the engine controller can control turning on the main heater and the sub-heater to maintain temperatures of the fixing belt 101 in the width direction at the fixing temperature. The temperature sensor facing the lateral end span of the fixing belt 101 can be eliminated, which reduces the cost of the fixing device.

The configurations according to the above-descried embodiment and the variation are examples, and embodiments of the present disclosure are not limited to the above. For example, the following aspects can achieve effects described below.

First Aspect

In a first aspect, a fixing device such as the fixing device 100 includes a fixing rotator such as the fixing belt 101, a first heater such as the main heater 102$a$, a second heater such as the sub-heater 102$b$, and circuitry such as the engine controller 152 in the control device 150. The first heater heats at least a region on the fixing rotator to heat a small recording medium having a width smaller than a predetermined width. The second heater heats a region on the fixing rotator to heat a maximum recording medium having a maximum width among widths of the recording media used in the fixing device. The second heater has a heat generation distribution in which a heat generation amount of each of both end spans corresponding to both end portions of the maximum recording medium in a width direction of the maximum recording medium is larger than a heat generation amount of a center span. The circuitry determines whether to turn on the first heater and turn off the second heater or to turn on both the first heater and the second heater based on power to bring the fixing rotator to a fixing temperature to fix an image such as the toner image to the small recording medium.

To fix the toner image onto the small sheet having the width smaller than the predetermined width, the control device turns on the first heater such as the main heater 102$a$ and turns off the second heater such as the sub-heater 102$b$. To fix the toner image onto the large sheet having the width equal to or larger than the predetermined width, the control device turns on both the first heater such as the main heater 102$a$ and the second heater such as the sub-heater 102$b$. However, under the condition in which the amount of heat taken away from the fixing rotator per unit time is large, for example, the condition in which the sheet passing through the fixing device under the low temperature environment is the thick sheet, the required power required to raise the fixing rotator to the fixing temperature may exceed the rated power of the first heater when the control device turns on the first heater and turns off the second heater to fix the toner image onto the small sheet having the width smaller than the predetermined width. Turning on the first heater and turning off the second heater under the above-described condition cannot quickly recover the temperature of the fixing rotator to the fixing temperature, may cause the fixing failure, and needs reducing productivity to avoid the fixing failure.

In the first aspect, the circuitry can turn on both the first heater and the second heater if the required power is larger than the rated power of the first heater. Under the condition in which the amount of heat taken away from the fixing rotator per unit time is large, the circuitry can turn on the second heater in addition to the first heater. As a result, under the condition in which the amount of heat taken away from the fixing rotator per unit time is large, the circuitry can more quickly recover the temperature of the fixing rotator to the fixing temperature than the circuitry that turns on the first heater and turns off the second heater to control the temperature of the fixing rotator. The fixing device can perform the fixing operation without decreasing the productivity even under the condition in which the amount of heat taken away from the fixing rotator per unit time is large.

Second Aspect

In a second aspect, the circuitry in the fixing device according to the first aspect determines whether the power is equal to or smaller than a rated power of the first heater such as the main heater 102$a$. In response to determining that the power is equal to or smaller than the rated power of the first heater, the circuitry turns on the first heater and turns off the second heater. In response to determining that the power is larger than the rated power of the first heater, the circuitry turns on the first heater at the rated power and the second heater at a power equal to a difference between the rated power of the first heater and the power to bring the fixing rotator to the fixing temperature to fix the image such as the toner image to the small recording medium.

According to the second aspect, turning on the first heater and the second heater can quickly recover the temperature of the fixing rotator to the fixing temperature in a case in which the required power exceeds the rated power of the first heater, for example, under the condition in which the amount of heat taken away from the fixing rotator per unit time is large. The fixing device can perform the fixing operation without decreasing the productivity even under the condition in which the amount of heat taken away from the fixing rotator per unit time is large. In addition, turning on the first heater at the rated power can reduce the power of the second heater to the necessary minimum power, which can reduce temperature increase in a region of the fixing rotator outside a sheet passing region along which the recording medium is conveyed, such as the temperature increase in the lateral end span of the fixing belt.

Third Aspect

In a third aspect, the fixing device according to the first aspect or the second aspect further includes a temperature detecting sensor such as the temperature detecting sensor 110 to detect a temperature of the fixing rotator such as the fixing belt 101, and the circuitry periodically determines the power to bring the fixing rotator to the fixing temperature to fix the image to the small recording medium based on a difference between the fixing temperature and a temperature detected by the temperature detecting sensor.

According to the third aspect, the circuitry can accurately obtain the electric power to bring the fixing rotator to the fixing temperature.

Fourth Aspect

In a fourth aspect, the first heater such as the main heater 102*a* in the fixing device according to any one of the first aspect to the third aspect has a uniform heat generation distribution in a range facing the maximum recording medium in the width direction, and a rated power of the first heater is larger than a rated power of the second heater.

According to the fourth aspect, turning on the first heater and turning off the second heater enables uniformly heating the fixing rotator in the width direction, and turning on the first heater and the second heater enables increasing a heat generation amount to heat a lateral end span of the foxing rotator to be larger than a heat generation amount to heat a center span of the fixing rotator.

For example, a lot of amount of heat transfers from the lateral end span of the fixing rotator to a lateral end contact member such as the guide 451 in contact with the lateral end span of the fixing rotator when the temperature of the lateral end contact member is low, for example, when a power switch of the image forming apparatus is turned on. At this time, turning on the first heater and the second heater to increase the heat generation amount to heat the lateral end span of the foxing rotator to be larger than the heat generation amount to heat the center span of the fixing rotator can substantially uniform the temperature distribution of the fixing rotator in the width direction. After the first heater and the second heater heat the fixing rotator for the predetermined time period, the temperature of the lateral end contact member becomes substantially the same as that of the fixing rotator. The temperature of the lateral end contact member that becomes substantially the same as the temperature of the fixing rotator decreases the amount of heat transferring from the lateral end span of the fixing rotator to the lateral end contact member. At this time, the temperature of the fixing rotator can be substantially uniform in the width direction without increasing the heat generation amount to heat the lateral end span of the foxing rotator to be larger than the heat generation amount to heat the center span of the fixing rotator. Accordingly, after the predetermined time period elapses, turning on the first heater and turning off the second heater can substantially maintain the temperature of the fixing rotator in the width direction at the predetermined temperature. Since turning on the first heater and turning off the second heater can substantially maintain the temperatures of the fixing rotator in the width direction at the predetermined temperature, the temperature detecting sensor for the second heater can be eliminated. The above-described configuration and control can reduce the number of temperature detecting sensors and maintain the temperatures of the fixing rotator in the width direction substantially at the predetermined temperature, which reduces the cost of the fixing device.

In addition, setting the rated power of the first heater to be larger than the rated power of the second heater enables the circuitry to mainly turn on the first heater after the predetermined time period elapses, as described in the embodiment.

Fifth Aspect

In a fifth aspect, the fixing device according to the fourth aspect includes the first heater such as the main heater 102*a* having the rated power that is 1.5 times or more of the rated power of the second heater such as the sub-heater 102*b*.

According to the fifth aspect, the circuitry can mainly turn on the first heater after the predetermined time elapses as described in the embodiment.

Sixth Aspect

In a sixth aspect, the fixing device according to the fourth aspect or the fifth aspect includes the first heater such as the main heater 102*a* having the rated power equal to or smaller than 1000 W.

The fixing device according to the sixth aspect can prevent the occurrence of flickers in the small illumination of the user's room in which the image forming apparatus is disposed.

Seventh Aspect

In a seventh aspect, the circuitry such as the control device 150 in the fixing device according to the fourth aspect turns on the first heater and the second heater at a predetermined ratio of power for turning on the first heater to power for turning on the second heater to fix an image to a large recording medium having a width larger than the predetermined width until a predetermined time period elapses after a fixing operation starts. The circuitry determines whether the power for fixing the image to the large recording medium after the predetermined time period elapses is larger than the rated power of the first heater. In response to determining that the power for fixing the image to the large recording medium after the predetermined time period elapses is equal to or smaller than the rated power of the first heater, the circuitry turns on the first heater and turns off the second heater. In response to determining that the power for fixing the image to the large recording medium after the predetermined time period elapses is larger than the rated power of the first heater, the circuitry turns on the first heater at the rated power and the second heater at a power equal to a difference between the power for fixing the image to the large recording medium after the predetermined time period elapses and the rated power of the first heater.

As described in the embodiment, when the predetermined time elapses after the fixing operation starts, the heat transfer from the lateral end span of the fixing rotator such as the fixing belt 101 to the lateral end contact member such as the guide 451 decreases, and the temperature decrease in the lateral end span of the fixing rotator does not occur even if the amount of heat heating the lateral end span of the fixing rotator is not larger than the amount of heat heating the center span of the fixing rotator. Therefore, the first heater such as the main heater 102*a* and the second heater such as the sub-heater 102*b* heat the fixing rotator until the predetermined time elapses to prevent the occurrence of the temperature decrease in the lateral end span of the fixing rotator. After the predetermined time elapses, if the power to fix the image to the large recording medium is equal to or smaller than the rated power of the first heater, the circuitry performs a power control that mainly turns on the first heater to heat the fixing rotator, which prevents the temperature in the lateral end span of the fixing rotator from being larger than the temperature in the center span of the fixing rotator.

Eighth Aspect

In an eighth aspect, the first heater such as the main heater 102*a* in the fixing device according to any one of the first aspect to the third aspect has a heat generation distribution in which a heat generation amount of each of both end portions corresponding to both end portions of the maximum recording medium in the width direction of the maximum recording medium is larger than a heat generation amount of a center portion.

The first heater according to the eighth aspect can prevent the occurrence of the temperature increase in the lateral end span of the fixing rotator such as the fixing belt 101 even when the circuitry turns on the first heater and the second heater to satisfy the power larger than the rated power of the first heater such as the main heater 102*a* as described in the variation.

Ninth Aspect

In a ninth aspect, the circuitry such as the control device 150 in the fixing device according to the eighth aspect turns on the first heater and the second heater at a predetermined ratio of power for turning on the first heater to power for turning on the second heater to fix an image to a large recording medium having a width larger than the predetermined width and changes the predetermined ratio after a predetermined time period elapses from a start of a fixing operation.

As described in the variation, until the predetermined time period elapses from the start of the fixing operation, the circuitry according to the ninth aspect turns on the first heater and the second heater at a ratio at which the heat generation amount to heat the lateral end span of the fixing rotator in the width direction is larger than the heat generation amount to heat the center span of the fixing rotator in the width direction. After the predetermined time period elapses, the circuitry turns on the first heater and the second heater at a ratio at which total heat generation amounts generated by the first heater and the second heater at positions in the width direction are even in the width direction. As a result, the occurrence of the temperature decrease in the lateral end span of the fixing rotator is prevented. After the predetermined time period elapses, the circuitry can substantially maintain temperatures at positions of the fixing rotator in the width direction at the fixing temperature using the temperature detecting sensor that detects the temperature near the center of the fixing rotator in the width direction of the fixing rotator.

Another Aspect

In another aspect, the circuitry such as the control device 150 in the fixing device according to the first aspect to the ninth aspect periodically determines the power to fix the image to the recording medium based on a difference between the target temperature and a temperature detected by the temperature detecting sensor.

According to this, the circuitry can control the temperature of the fixing rotator to the target temperature as described in the embodiment.

Tenth Aspect

In a tenth aspect, an image forming apparatus such as the printer 200 includes an image former to form an image on a recording medium and the fixing device according to any one of the first aspect to the ninth aspect such as the fixing device 100 to fix the image to the recording medium. The image former includes, for example, the tandem structure, the optical writing device 8, and the transfer device 71 to form the image on the recording medium. According to the tenth aspect, high productivity can be obtained.

The present disclosure has an eleventh aspect to a nineteenth aspect regarding an image forming apparatus. The eleventh aspect to nineteenth aspect includes the same structures and the similar advantages of the first aspect to the ninth aspect, respectively.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

What is claimed is:

1. A fixing device comprising:

a fixing rotator;

a first heater configured to heat at least a region on the fixing rotator to heat a small recording medium having a width smaller than a desired width;

a second heater configured to heat a region on the fixing rotator to heat a maximum recording medium having a maximum width among widths of recording media used in the fixing device, the second heater having a heat generation distribution in which a heat generation amount of each of both end portions corresponding to both end portions of the maximum recording medium in a width direction of the maximum recording medium is larger than a heat generation amount of a center portion; and circuitry configured to, determine whether to turn on the first heater and turn off the second heater or to turn on both the first heater and the second heater based on a required power to bring the fixing rotator to a fixing temperature to fix an image onto the small recording medium, determine whether the required power is equal to or smaller than a rated power of the first heater, turn on the first heater and turn off the second heater in response to determining that the required power is equal to or smaller than the rated power of the first heater, and turn on the first heater at the rated power and the second heater at a power equal to a difference between the required power and the rated power of the first heater in response to determining that the required power is larger than the rated power of the first heater.

2. The fixing device according to claim 1, wherein the circuitry is further configured to:

periodically determine the required power based on a difference between the fixing temperature and a temperature detected by a single temperature detecting sensor.

3. An image forming apparatus comprising:

an image former configured to form an image on a recording medium; and the fixing device according to claim 2 configured to fix the image on the recording medium.

4. The fixing device according to claim 1, wherein the first heater has a heat generation distribution in which a heat generation amount of each of both end portions corresponding to both end portions of the maximum recording medium in the width direction of the maximum recording medium is smaller than a heat generation amount of a center portion.

5. An image forming apparatus comprising:

an image former configured to form an image on a recording medium; and the fixing device according to claim 4 configured to fix the image on the recording medium.

6. An image forming apparatus comprising:

an image former configured to form an image on a recording medium; and the fixing device according to claim 1 configured to fix the image on the recording medium.

7. The fixing device according to claim 1, wherein a rated power of the first heater is 1.5 times or more of a rated power of the second heater.

8. An image forming apparatus comprising:

an image former configured to form an image on a recording medium; and the fixing device according to claim 7 configured to fix the image on the recording medium.

9. The fixing device according to claim 1, wherein a rated power of the first heater is equal to or smaller than 1000 W.

10. An image forming apparatus comprising:

an image former configured to form an image on a recording medium; and the fixing device according to claim 9 configured to fix the image on the recording medium.

11. A fixing device comprising:

a fixing rotator;

a first heater configured to heat at least a region on the fixing rotator to heat a small recording medium having a width smaller than a desired width;

a second heater configured to heat a region on the fixing rotator to heat a maximum recording medium having a maximum width among widths of recording media used in the fixing device, the second heater having a heat generation distribution in which a heat generation amount of each of both end portions corresponding to both end portions of the maximum recording medium in a width direction of the maximum recording medium is larger than a heat generation amount of a center portion; and circuitry configured to, determine whether to turn on the first heater and turn off the second heater or to turn on both the first heater and the second heater based on a required power to bring the fixing rotator to a fixing temperature to fix an image onto the small recording medium, wherein the first heater has a uniform heat generation distribution in a range facing the maximum recording medium in the width direction, and a rated power of the first heater is larger than a rated power of the second heater.

12. The fixing device according to claim 11, wherein the rated power of the first heater is 1.5 times or more of the rated power of the second heater.

13. An image forming apparatus comprising:

an image former configured to form an image on a recording medium; and the fixing device according to claim 12 configured to fix the image on the recording medium.

14. The fixing device according to claim 11, wherein the rated power of the first heater is equal to or smaller than 1000 W.

15. An image forming apparatus comprising:

an image former configured to form an image on a recording medium; and the fixing device according to claim 14 configured to fix the image on the recording medium.

16. The fixing device according to claim 11, wherein the circuitry is further configured to:

turn on the first heater and the second heater at a desired ratio of power for turning on the first heater to power for turning on the second heater to fix an image to a large recording medium having a width larger than the desired width until a desired time period elapses after a fixing operation starts;

determine whether the required power after the desired time period elapses is larger than the rated power of the first heater;

turn on the first heater and turn off the second heater in response to determining that the required power after the desired time period elapses is equal to or smaller than the rated power of the first heater; and turn on the first heater at the rated power and the second heater at a power equal to a difference between the required power after the desired time period elapses and the rated power of the first heater in response to determining that the required power after the desired time period elapses is larger than the rated power of the first heater.

17. An image forming apparatus comprising:

an image former configured to form an image on a recording medium; and the fixing device according to claim 16 configured to fix the image on the recording medium.

18. An image forming apparatus comprising:

an image former configured to form an image on a recording medium; and the fixing device according to claim 11 configured to fix the image on the recording medium.

19. A fixing device comprising:

a fixing rotator;

a first heater configured to heat at least a region on the fixing rotator to heat a small recording medium having a width smaller than a desired width;

a second heater configured to heat a region on the fixing rotator to heat a maximum recording medium having a maximum width among widths of recording media used in the fixing device, the second heater having a heat generation distribution in which a heat generation amount of each of both end portions corresponding to both end portions of the maximum recording medium in a width direction of the maximum recording medium is larger than a heat generation amount of a center portion; and circuitry configured to, determine whether to turn on the first heater and turn off the second heater or to turn on both the first heater and the second heater based on a required power to bring the fixing rotator to a fixing temperature to fix an image onto the small recording medium, turn on the first heater and the second heater at a desired ratio of power for turning on the first heater to power for turning on the second heater to fix an image to a large recording medium having a width larger than the desired width, and change the desired ratio after a desired time period elapses from a start of a fixing operation, and wherein the first heater has a heat generation distribution in which a heat generation amount of each of both end portions corresponding to both end portions of the maximum recording medium in the width direction of the maximum recording medium is smaller than a heat generation amount of a center portion.

20. An image forming apparatus comprising:

an image former configured to form an image on a recording medium; and the fixing device according to claim 19 configured to fix the image on the recording medium.

* * * * *